(12) United States Patent
Channapragada et al.

(10) Patent No.: US 12,132,946 B2
(45) Date of Patent: **\*Oct. 29, 2024**

(54) SYSTEMS AND METHODS FOR STREAMING MEDIA CONTENT DURING UNAVAILABILITY OF CONTENT SERVER

(71) Applicant: Rovi Guides, Inc., San Jose, CA (US)

(72) Inventors: Srikanth Channapragada, Karnataka (IN); Ishan Bhadula, Uttarakhand (IN); Vivek Sehgal, Uttar Pradesh (IN); Greeshma Jagadha Phani Lakshmi Alapati, Andhra Pradesh (IN); Vikram Makam Gupta, Karnataka (IN); Reda Harb, Issaquah, WA (US)

(73) Assignee: Rovi Guides, Inc., San Jose, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/204,443

(22) Filed: Jun. 1, 2023

(65) Prior Publication Data

US 2023/0308696 A1    Sep. 28, 2023

Related U.S. Application Data

(63) Continuation of application No. 17/490,905, filed on Sep. 30, 2021, now Pat. No. 11,706,469.

(51) Int. Cl.
*H04L 41/0893* (2022.01)
*H04L 67/1008* (2022.01)
(Continued)

(52) U.S. Cl.
CPC ..... *H04N 21/2405* (2013.01); *H04L 41/0893* (2013.01); *H04L 67/1008* (2013.01);
(Continued)

(58) Field of Classification Search
CPC ......... H04N 21/2405; H04N 21/23103; H04N 21/2402; H04N 21/25833;
(Continued)

(56) References Cited

U.S. PATENT DOCUMENTS 9,516,105 B1 \* 12/2016 Roseman ............. H04N 21/632
9,549,043 B1    1/2017 Stoica et al.
(Continued)

*Primary Examiner* — Johnny B Aguiar
(74) *Attorney, Agent, or Firm* — Haley Guiliano LLP

(57) ABSTRACT

Systems and methods are described herein for streaming during unavailability of a content server. Upon determining that there are conditions indicating buffering issues during delivery of a media asset, a server determines a first group of devices suitable for receiving the media asset from the server and sharing the media asset on a peer-to-peer network. Then, the server determines a second group of devices suitable for receiving the media asset on a peer-to-peer network from a first group device. The server then determines groupings within which to share and receive the media asset. Next, the server transmits instructions to the devices in the first group to maintain in buffer and share certain portions of the media asset with the second group devices within their grouping. Finally, the server updates information detailing the media asset portions the devices are maintaining in buffer and sharing.

16 Claims, 12 Drawing Sheets

(51) Int. Cl.
*H04L 67/1017* (2022.01)
*H04N 21/231* (2011.01)
*H04N 21/235* (2011.01)
*H04N 21/24* (2011.01)
*H04N 21/258* (2011.01)
*H04N 21/647* (2011.01)
*H04N 21/63* (2011.01)

(52) U.S. Cl.
CPC ... *H04L 67/1017* (2013.01); *H04N 21/23103* (2013.01); *H04N 21/2353* (2013.01); *H04N 21/2402* (2013.01); *H04N 21/25833* (2013.01); *H04N 21/64738* (2013.01); *H04N 21/632* (2013.01)

(58) Field of Classification Search
CPC .......... H04N 21/64738; H04N 21/632; H04N 21/2404; H04N 21/47202; H04L 41/0893; H04L 67/1008; H04L 67/1017; H04L 67/1001; H04L 67/1091; H04L 67/59; H04L 69/40
See application file for complete search history.

(56) References Cited

U.S. PATENT DOCUMENTS

| | | | |
|---|---|---|---|
| 10,305,721 B1 | 5/2019 | Binns et al. | |
| 2002/0154892 A1* | 10/2002 | Hoshen | H04N 7/17354 725/98 |
| 2003/0093803 A1* | 5/2003 | Ishikawa | H04N 21/47202 348/E7.071 |
| 2004/0024886 A1* | 2/2004 | Saxena | H04N 21/4627 348/E7.063 |
| 2010/0146569 A1* | 6/2010 | Janardhan | H04N 21/43615 725/98 |
| 2011/0222558 A1* | 9/2011 | Beser | H04N 7/17309 370/468 |
| 2014/0094140 A1 | 4/2014 | Misra et al. | |
| 2015/0012662 A1* | 1/2015 | Li | H04L 67/5681 709/231 |
| 2022/0141151 A1* | 5/2022 | He | H04L 67/1008 709/226 |

* cited by examiner

SYSTEMS AND METHODS FOR STREAMING MEDIA CONTENT DURING UNAVAILABILITY OF CONTENT SERVER

CROSS-REFERENCE TO RELATED APPLICATION

This application is a continuation of U.S. patent application Ser. No. 17/490,905, filed Sep. 30, 2021, the disclosure of which is hereby incorporated by reference herein in its entirety.

BACKGROUND

The present disclosure is directed to methods for streaming during unavailability of a content server. Specifically, when there are conditions at a content server indicating buffering issues during media asset delivery, the server transmits instructions to certain devices to maintain portions of media assets in a buffer and share those portions of media assets with other devices on a network.

SUMMARY

Within media content servers, specifically on-demand content servers (e.g., over-the-top (OTT) video delivery servers), there is often trending content that is requested by multiple users simultaneously. With several different globally located users all requesting the same media asset, servers often become overloaded with requests, and users start to experience buffering issues. Buffering issues can also manifest as a result of network issues between user devices and the server. Buffering issues can lead to user dissatisfaction and a high chance of users stopping streaming of media content. This may result in a loss of subscribers to the services providing the content.

In one conventional approach, more servers with the capability to handle higher requests could be designed, purchased, and integrated into an existing system of servers in order to prevent server overload. This approach is deficient because it consumes financial resources, takes time to implement and may end up being cost-inefficient in the long run. Also, network issues experienced by some users may result from local conditions affecting communication between those users and the server and cannot be resolved by simply adding more servers. Further, as more users begin to request content, even with an increased number of servers, overload may still occur, again leading to buffering issues as the servers attempt to serve media content to all the requesting users.

In another conventional example, barriers to entry for requesting media content may be constructed to prevent server overload. For example, a content provider may charge additional fees for popular content when it is first released, release popular content first to premium members, or stagger the release of media content to different geographic locations at different times. Providing barriers to entry is an inadequate solution because it is exclusive and does not serve all possible customers that may otherwise be requesting the media content. Dissuading users may lose money in the long run, as users may lose interest in consuming content they otherwise may have purchased if the price had not been raised, or users may choose a different content provider from which to stream the content.

To overcome these problems, systems and methods are provided herein for determining when there are conditions at a content server indicating buffering issues during delivery of a media asset, analyzing the devices requesting the media asset to identify a group of devices best suited to share buffered portions of the media asset and a group of devices best suited to receive buffered portions of the media asset on a network, applying load balance algorithms to determine distribution, and transmitting instructions to the devices to distribute and receive the portions of the media content.

In one implementation, network conditions indicating buffering issues are determined. In some embodiments, this determination is performed during delivery of at least a portion of a media asset. For example, a server determines that there are conditions indicating buffering issues during delivery of a media asset by detecting edge server overload, or network issues between client devices and edge servers in a content delivery network. Network issues may include slow internet performance, high bandwidth usage, network path errors, network latency issues, or any other issue affecting the ability of client devices to communicate with servers on the network. Buffering issues may be detected in real time, by, for example, a server detecting current server overload, or a server receiving indications from user devices that users are having trouble streaming. The server may, alternatively or additionally, determine conditions indicating the potential for buffering issues to occur by detecting that the number of requests from user devices has exceeded a threshold value, or by receiving an indication that a soon-to-be-released media asset is a popular media asset that is likely to garner a high number of requests for viewing from the server in a relatively short time period. In some embodiments, client devices may periodically report their network conditions to the server. The server may compare the most recently reported network conditions to previously reported network conditions to investigate for trends indicating network issues.

Such aspects enable a server to not only detect buffering issues in real time, but also to prepare for buffering issues that are likely to occur. For example, if conditions indicate that there are current buffering issues involved in the delivery of a media asset, or a high likelihood for future buffering issues, the server can adequately prevent or remedy the buffering issues.

In one embodiment, the server begins the process of remedying buffering issues by identifying a first group of devices out of the devices requesting a media asset that are suitable for both receiving the media asset and sharing the media asset on a network. One approach to this involves determining the content delivery type associated with the requested media asset and comparing the content delivery type with intrinsic metadata associated with the devices requesting the media asset. In some embodiments, a media asset is meant to be delivered to devices via a live stream (live delivery). In other embodiments, a media asset is meant to be delivered on demand (VOD delivery). In some embodiments, intrinsic metadata includes one or more of device location, device power status, device type, CPU utilization, device playback performance metrics, bit rate, network type, or mobility.

In one implementation, the server may determine that, for a device to be in the first group of devices, the delivery type of the media asset necessitates that the device have certain aspects of intrinsic metadata. For example, for a live delivery media asset, a device may need to be within a certain geographic distance of the server, e.g., within 100 miles. In order to be a first group device, a device may need to be plugged into a power source, or have a certain level of battery, e.g., above 80% battery level. In some embodiments, a device that is initially placed in the first group may periodically report its power status and, if its power status no longer meets the requirements (e.g., the device is no longer plugged into a power source or the battery level of the device has fallen below a threshold level), the device is removed from the first group. The device may also need to be of a certain device type and available processing power, e.g., a computer having under 50% CPU utilization. A certain level of playback performance, e.g., zero dropped frames in recent streaming or a bit rate above eight megabits per second, may also be required. A reliable network connection, e.g., a Wi-Fi network connection, or a certain mobility, e.g., fixed mobility, may be needed as well. The server may have any one or combination of these intrinsic metadata as requirements to be a device within the first group of devices for a certain delivery type of a media asset. In another approach, the server may use any requirements, including those not listed above, to determine the devices within the first group of devices.

Such aspects enable a server to determine the most suitable devices for receiving a media asset from the server and sharing the media asset on a peer-to-peer network. This ensures that all devices within the first group have the capability to deliver content to other devices without buffering issues that would otherwise occur.

In one implementation, the server identifies a second group of devices, out of the devices requesting a media asset, that are suitable for receiving the media asset on a peer-to-peer network from a device out of the first group. In some embodiments, the second group of devices may be all devices requesting the media asset that are not within the first group. In another embodiment, not all devices excluded from the first group are suitable for receiving a media asset on a network from a device out of the first group. In this approach, the server may determine the content delivery type associated with the requested media asset and compare the content delivery type with intrinsic metadata associated with the devices requesting the media asset that are excluded from the first group in order to determine which devices are eligible to be within the second group of devices.

In the above implementation, the server may determine that, for a device to be in the second group of devices, the delivery type of the media asset necessitates that the device have certain aspects of intrinsic metadata. For example, for a VOD delivery media asset, a device may need to be within a certain geographic distance of at least one device within the first group, e.g., within 100 miles. In order to be a second group device, a device may need to be plugged into a power source, or have a certain level of battery, e.g., above 50% battery level. The device may also need to be of a certain device type and available processing power, e.g., a smartphone having under 80% CPU utilization. A certain level of playback performance, e.g., less than ten dropped frames in recent streaming, or a bit rate above five megabits per second, may be necessary. The device may also require a stable cellular data or Wi-Fi network connection, or a fixed mobility. The server may have any one or any combination of these intrinsic metadata as requirements to be a device within the second group of devices for a certain delivery type of a media asset. In another approach, the server may use any requirements, including those not listed above, to determine the devices within the second group of devices.

In one embodiment, all devices requesting the media asset will be in either the first group or the second group of devices. In the instance that at least one of the devices requesting the media asset is not in either group of devices, the server may deliver the media asset for viewing to the one or more devices that are not in the first or the second group without further instructions.

Such aspects enable a server to determine the most suitable devices for receiving a media asset from another device on a network. This ensures that all devices within the second group receive content from other devices without buffering issues that would otherwise occur. The establishment of a second group of devices that receive content from other devices may decrease the load on the server dramatically, as all the requests for the media asset from devices within the second group that would otherwise go to the server are now fulfilled by first group devices. Today, browsers such as Chrome, Safari, and many other mobile operating systems and applications support open-source Web Real-Time Communication (WebRTC) in order to support peer-to-peer communication. Such protocol can be relied upon to allow client devices to communicate with each other, i.e., video content can be transmitted and received using WebRTC's data channel.

In one embodiment, the server determines groupings of devices, containing devices from the first group and the second group, to determine the one or more particular second group devices with which each of the first group devices will be sharing. In one approach, to accomplish this, the server first determines clusters of devices, containing devices from the first and second group. The server may determine clusters based on one or more factors associated with the devices, including progress within a media asset, device type, device location, or device ability to handle inbound and outbound traffic. For example, the server may determine that a cluster contains all devices within a certain time frame of the media asset, e.g., within the first ten minutes of playback. A cluster may also contain all devices of a certain type, e.g., smartphones. The cluster requirement also may be that all devices must be within a certain location, e.g., 50 miles of each other. Alternatively, all devices within a cluster may need to have a certain threshold level of ability to handle inbound and outbound traffic, e.g., all the first group devices are able to handle one inbound request and all the second group devices are able to handle one outbound request. The server may have any one or any combination of these factors as requirements for devices to be in the same cluster. In another approach, the server may use any requirements, including those not listed above, to determine clusters of devices.

Such aspects enable the server to determine clusters of similar devices as an intermediate step to deciding the groupings of devices within which to share and receive content. Instead of having to consider the entire plurality of devices requesting the media asset when deciding load distribution, the server now has multiple clusters of devices to treat independently from each other. This will reduce time and resource load on the server and allow groupings to be determined more quickly and efficiently, as the server is considering fewer devices at a time when distributing media asset load between devices.

In some embodiments, the server may determine that the determined clusters of devices are the groupings of devices within which to share and receive content. In some embodiments, the server may apply one or more load balancing algorithms to the clusters of devices, in order to determine the groupings. The server may determine which load balancing algorithm to apply based on one or more factors associated with the devices, including device type, current device playback performance metrics, quality of stream the device can serve, or number of requests the device can serve.

For example, if one or more of the factors for all devices within a cluster are relatively similar, e.g., the devices are all smartphones, the number of recent dropped frames are all close to zero, the devices can serve high-definition streaming, or all first group devices within the cluster can serve one request each, the server may apply a round robin algorithm to the cluster. The application of a round robin algorithm may result in the server cycling through the devices in each cluster and determining groupings containing an equal number of devices, with an even distribution of first and second group devices, within each grouping. For example, a grouping may contain one smartphone from the first group and one smartphone from the second group.

In another example, if one or more of the factors for all devices within a cluster are relatively different, e.g., the devices are a mix of smartphones, computers, and televisions; the number of recent dropped frames vary between the devices; some of the devices can serve high definition streaming and some can only serve low definition streaming; or the first group devices within the cluster can serve varying numbers of requests, the server may apply a weighted round robin algorithm to the cluster.

In some embodiments, in the process of applying a weighted round robin algorithm, the server may assign weights to the devices within each cluster based on one or more of device type, current device playback performance metrics, quality of stream the device can serve, or number of requests each first group device can serve. For example, if weighting is based on device type, all devices of the same type are assigned the same weight, e.g., all smartphones receive a weight of one, all computers receive a weight of two, and all televisions receive a weight of three. If weighting is based on current device playback performance metrics, for example, all devices with a large number of dropped frames in recent streaming history will receive the same weight and all devices with lower number of dropped frames in recent streaming history will receive the same weight, e.g., a weight of two for a large number of dropped frames, and a weight of one for a low number of dropped frames. If weighting is based on quality of stream the device can serve, for example, all devices that can stream in high definition (HD) will receive the same weight, e.g., two, and all devices that can only stream in standard definition (SD) will receive the same weight, e.g., one. If weighting is based on number of requests each first group device can serve, for example, each first group device may receive a weight equal to the number of requests it can serve, e.g., if a device can serve four requests, it will receive a weight of four, and the second group devices within the cluster will each receive a weight of one, as each device counts as one request. Weighting may be based on more than one of the above factors. In this case, the above method for determining weights may be utilized, and weights may be added based on each factor, e.g., a smartphone that can stream in high definition may receive a weight of three, while a smartphone that can stream in low definition may receive a weight of two. In some embodiments, the weight assigned to a first group device may also depend on its power status. If a first group device is plugged into a power source, it may be assigned its weight as discussed above. However, if the device is currently running on battery power, the battery level may be used as a weighting coefficient in determining the weight assigned to the device. For example, if the device would normally be assigned a weight of four but is running on battery power with a battery level of 80%, the normally assigned weight of four may be multiplied by 0.8 to obtain a reduced weight of 3.2. A floor function may be used to round this modified weight down to three. In another approach, any method for determining weights based on the above factors may be used. Any number of factors, including factors not listed above, may be used to determine weights.

In some embodiments, once the server assigns weights to the devices within each cluster, the server may apply a weighted round robin algorithm to determine groupings of first group devices and second group devices within each cluster. Application of a weighted round robin algorithm may result in an unequal number of devices, with an uneven distribution of first and second group devices, within each grouping. For example, a first group device with a weight of four may be grouped with four second group devices, each with a weight of one. In some embodiments, the sum of the weights of the first group devices within a grouping will be equivalent to the sum of the weights of the second group devices within the grouping.

Such aspects enable the server to decide groupings of devices within which to share and receive content in a way that allows portions of media content to be shared the most efficiently and effectively, without going beyond the capabilities of any devices. The groupings are balanced, not necessarily in number of devices, but in device capacity for sharing and receiving. While all devices within a grouping sharing content with other devices (first group devices) have already been deemed suitable for both receiving content from the server and for sharing content with other devices, and all devices within a grouping receiving content from other devices (second group devices) have already been deemed suitable for receiving content from other devices, eliminating an imbalance of resources further ensures that sharing between the suitable devices is without interruption, and therefore, ensures that all streaming is without buffering issues.

In some embodiments, the server transmits instructions to devices in the first group to maintain in a buffer certain portions of the media asset and share certain portions of the media asset with the second group devices within their grouping on the network. In one implementation, a dynamic cache size algorithm is applied to the first group devices to determine how much of a buffer size the devices should maintain, and which portions of the media asset each first group device should maintain in buffer and share. In some embodiments, the dynamic cache size determination algorithm is based on content delivery type and intrinsic metadata associated with each of the first group devices. For example, the server may determine that, because the media asset is delivered in a certain way, e.g., via VOD, the size of the sharing buffer must be a certain size, e.g., 100 megabits, because the first group device is within, for example, 500 miles of the one or more second group devices within its grouping. The size of the sharing buffer may also depend on the power status of the first group device. If the device is plugged into a power source, or has a certain level of battery, e.g., above 80% battery, the sharing buffer may be a larger size than it would be for a device that is not plugged into a power source, or a device that currently has less than, e.g., 80% battery. In another example, the server may determine the size of the sharing buffer based on the device type and available processing power of the first group device within a grouping, e.g., the sharing buffer must be 50 megabits because the first group device is a smartphone with under 80% CPU utilization. Another criterion for determining sharing buffer size may be a certain level of playback performance, e.g., because the first group device within a grouping has less than ten dropped frames in recent viewing and a bit rate above five megabits per second, the sharing buffer must be 200 megabits. The size of the sharing buffer may also be based on the type of network the first group device is connected to or the mobility of the connection, e.g., a stable cellular data or Wi-Fi network connection or a fixed mobility. Once the cache size of the sharing buffer is determined, the server may then choose an ending point for the sharing buffer based on the first group device's progress within the media asset, as well as the progress within the media asset of the one or more second group devices the first group device will be sharing media asset portions with. In some embodiments, the ending point for the sharing buffer may be the timepoint the first group device is currently at. In some embodiments, the ending point for the sharing buffer may be any timepoint before the ending point of the forward buffer of the first device. The server may then determine the starting point for the sharing buffer, based on the cache size of the sharing buffer. In this example, the locations of the starting point of the sharing buffer and the ending point of the sharing buffer determine the certain portions of the media asset to maintain in buffer and share, as all the portions within the sharing buffer may be maintained in buffer and shared. The server may have any one or any combination of these intrinsic metadata as criteria for determining the size of the sharing buffer, locations of the starting point of the sharing buffer and the ending point of the sharing buffer within a media asset. In another approach, the server may use any criteria, including those not listed above, to determine the size of the sharing buffer, as well as the locations of the starting point of the sharing buffer and the ending point of the sharing buffer.

Such aspects enable the server to ensure that an ideal buffer size, based on the capabilities of the device, is maintained at each first group device. Therefrom, the ideal portions of a media asset, for the capabilities and current playback position of the device, are also maintained in buffer and shared. This prevents further buffering issues, as no device is instructed to perform beyond its ability.

In some implementations, the server may store a media asset in such a way that the media asset is available to be requested by user devices for viewing. In response to determining that there are conditions indicating buffering issues during delivery of the media asset, the server may determine a first group of devices, out of the devices requesting the media asset, that are suitable for receiving the media asset from the server and sharing the media asset on a network. The server may then determine a second group of devices, out of the devices requesting the media asset, that are suitable for receiving the media asset on a network from a device out of the first group. After the server establishes the first and second groups of devices, the server may determine groupings of devices from the first group and the second group within which to share and receive the media asset. Once groupings are established, the server may transmit instructions to the devices in the first group to maintain in buffer certain portions of the media asset and share certain portions of the media asset with the second group devices within their grouping on the network. Finally, the server may update information detailing the portions of the media asset the devices are maintaining in buffer and sharing. When there are conditions indicating buffering issues during streaming, it is reasonable for a server to set aside a group of devices to begin sharing already buffered content with other devices. The need for the server to deliver content redundantly would be significantly reduced if some devices that have already received the content begin sharing it with others that have not yet received the content. It also logically follows to ensure that the devices that will share the content are suitable for this task, to eliminate any possible streaming or storage problems that could otherwise occur. The next logical step is to determine groupings of devices within which to share and receive the media asset. It would be inefficient and potentially ineffective to have all the first group devices share content with all of the second group devices. It is much more feasible to determine the best groupings of devices within which sharing and receiving will happen. Finally, it is reasonable to determine which specific portions of media assets first group devices are sharing with second group devices within their grouping. It would be ineffective for all first group devices to have to store and share every portion of the content they have already buffered, as they may not even have the capability to store and share that amount of content, and the second group devices in their grouping may not need all of the content.

BRIEF DESCRIPTION OF THE DRAWINGS

The present disclosure, in accordance with one or more various embodiments, is described with reference to the following figures. The drawings are provided for purposes of illustration only and merely depict typical or example embodiments. These drawings are provided to facilitate an understanding of the concepts disclosed herein and do not limit the breadth, scope, or applicability of these concepts. It should be noted that for clarity and ease of illustration these drawings are not necessarily made to scale.

DETAILED DESCRIPTION

Figure 1:
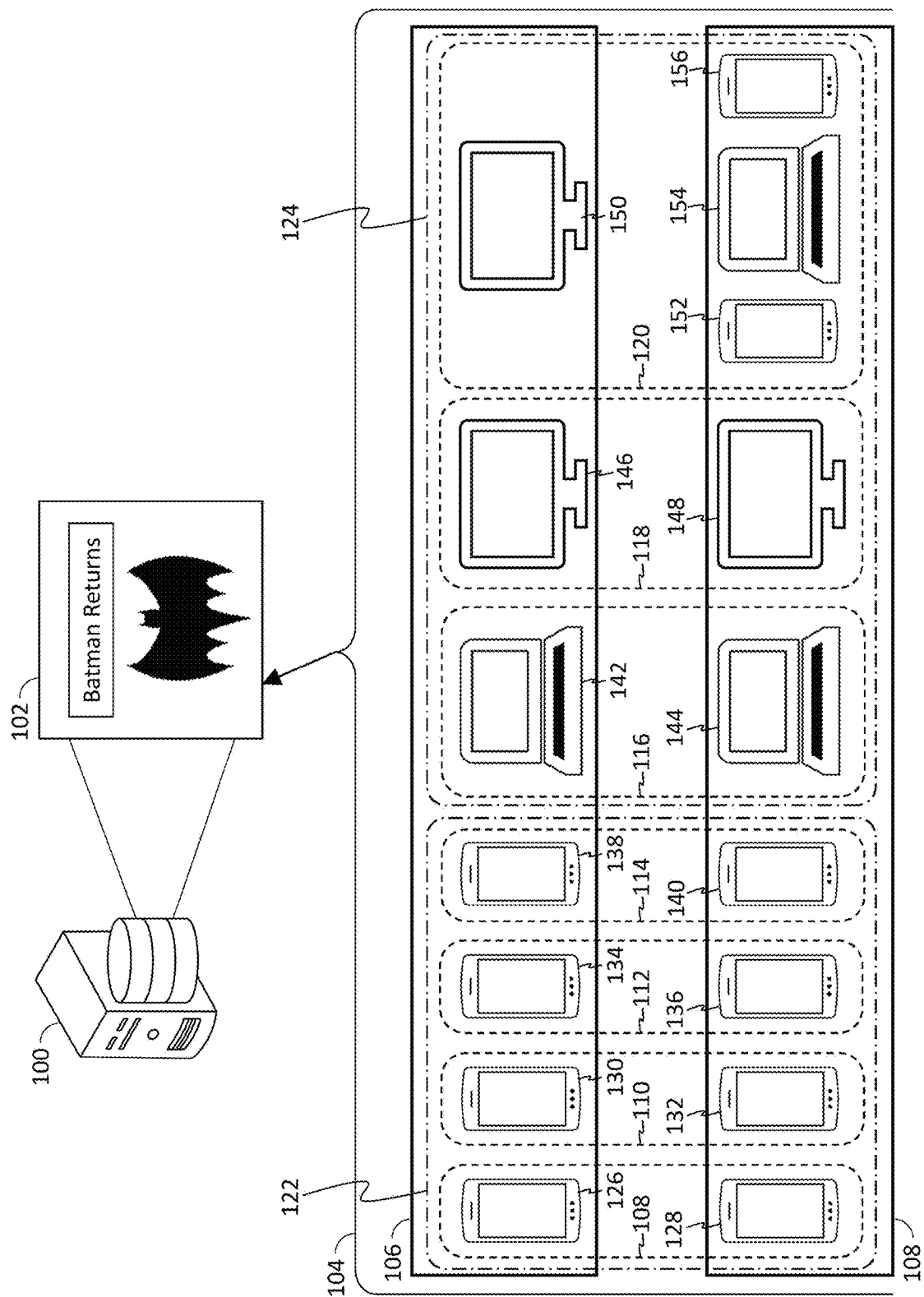
FIG. 1 is an illustrative example of a system for streaming a media asset to a plurality of devices requesting the media asset during unavailability of a content server, in accordance with some embodiments of the present disclosure.

FIG. 1 shows an illustrative example of a system for streaming during unavailability of a content server, in accordance with some embodiments of the present disclosure. Systems and methods are provided within FIG. 1 for determining when there are conditions at a content server indicating buffering issues during delivery of a media asset, analyzing the devices requesting the media asset to identify a group of devices best suited to share buffered portions of the media asset and a group of devices best suited to receive buffered portions of the media asset on a peer to peer network, applying load balance algorithms to determine distribution, and transmitting instructions to the devices to distribute and receive the portions of the media content. In some embodiments, FIG. 1 includes server 100 at which media asset 102 is hosted for streaming delivery to an arbitrary number ("N") of user devices 104, which may comprise different types of devices such as smartphones, tablets, computers, televisions, and any other media devices configured to receive streaming media data. FIG. 1 may include additional servers, devices, and/or networks. For example, functionality of server 100 may be shared between several servers (e.g., as described below, with reference to FIG. 7). For simplicity, a single server 100 is depicted in FIG. 1.

In some embodiments, server 100 receives N requests to view media asset 102 (e.g., "Batman Returns") from N user devices 104. In one implementation, server 100 is an OTT video delivery service server that receives requests over a network from user computing devices to view the media asset. The network may be the internet, a local area network, a wide area network, a cellular network, or any other suitable network. The OTT server may then provide the media asset for streaming, local storage, downloading, or any other media consumption operation to the requesting user devices 104.

In response to, or periodically while serving, requests from user devices 104, server 100 determines whether there are conditions indicating buffering issues during delivery of media asset 102 to at least one of the N user devices 104 requesting media asset 102. Conditions indicating buffering issues may include edge server overload at server 100, network issues between server 100 and any one of the N user devices 104, or any other network condition indicative of less-than-optimal performance. In one implementation, the conditions indicating buffering issues may be detected in real time. For example, a user input from one or more of the N user devices 104 may be received at server 100 indicating that one or more of the N user devices 104 is experiencing streaming problems. In cases where a user device employs adaptive bitrate streaming, server 100 may determine that the user device is experience buffering issues based on a request for a lower bitrate segment of media data compared to the bitrate of a previously requested segment of media data. Alternatively or additionally, the conditions indicating buffering issues may be conditions indicating the potential for buffering issues to occur. For example, server 100 may have a set capacity of user devices, such as 500 user devices, to which it can simultaneously serve requests for media asset 102. If server 100 detects that there are greater than 500 devices requesting media asset 102, server 100 may determine that there are conditions indicating buffering issues, as server 100 will be incapable of serving all requesting devices. In another example, server 100 may receive an indication (e.g., from another server over a network) that a soon-to-be-released media asset is a popular media asset and is likely to garner a high number of requests for viewing from server 100 in a relatively short time period.

In response to determining that there are network conditions indicating buffering issues, server 100 identifies a first group of devices 106 suitable for both receiving media asset 102 from server 100 and sharing at least a portion of media asset 102 with other user devices on the network. The first group of devices 106 may be a first subset of devices out of the N user devices 104 requesting media asset 102 from server 100. The first group of devices 106 may be identified based on a variety of factors. Exemplary methods for doing so are described below in connection with FIG. 2.

Server 100 also identifies a second group of devices 108 for which buffering issues are occurring or will soon occur that are also suitable for receiving media asset 102 from a device of the first group of devices 106. The second group of devices 108 may be a second subset of devices out of the N user devices 104 requesting media asset 102 from server 100. As with the first group of devices 106, the second group of devices 108 may be identified based on a variety of factors, with exemplary methods for doing so described below in connection with FIG. 2.

In some embodiments, after the second group of devices 108 is determined, server 100 may reduce the quality of the content being streamed to the devices within the second group. This ensures that, before the second group devices begin receiving content from first group devices on a peer-to-peer network, the forward buffer of each of the second group devices is filled so there will be no streaming interruptions. Adaptive streaming protocols usually prefer reliability over latency, especially for live video streaming, so the users of the second group devices may be satisfied with a temporary decrease in streaming quality so long as there are no interruptions in playback.

Server 100 determines groupings of devices 108, 110, 112, 114, 116, 118, and 120. Each grouping has at least one device from the first group of devices 106 and one device from the second group of devices 108. In one implementation, server 100 determines groupings by first determining clusters of devices 122 and 124. Clusters are determined as an intermediate step to deciding the groupings of devices within which to share and receive content. When servers determine how to distribute portions of media assets for sharing between devices, having clusters of devices makes it a simpler process than having to determine load distribution amongst the entire plurality of devices requesting the media asset. The clusters of devices 122 and 124 may be determined using methods described below in connection with FIG. 3. The groupings of devices 108, 110, 112, 114, 116, 118, and 120 may be determined in different using methods described below in connection with FIGS. 4 and 5.

Server 100 transmits instructions to each device in the first group of devices 106 to maintain in a buffer certain portions of media asset 102 for sharing on a network with the devices in the second group of devices 108 within its respective grouping. In some embodiments, the network is a peer-to-peer network. For example, server 100 transmits instructions to device 126 to maintain in buffer certain portions of media asset 102 to share with device 128, server 100 transmits instructions to device 130 to maintain in buffer certain portions of media asset 102 to share with device 132, server 100 transmits instructions to device 134 to maintain in buffer certain portions of media asset 102 to share with device 136, server 100 transmits instructions to device 138 to maintain in buffer certain portions of media asset 102 to share with device 140, server 100 transmits instructions to device 142 to maintain in buffer certain portions of media asset 102 to share with device 144, server 100 transmits instructions to device 146 to maintain in buffer certain portions of media asset 102 to share with device 148, and server 100 transmits instructions to device 150 to maintain in buffer certain portions of media asset 102 to share with device 152, device 154, and device 156. The instructions may be transmitted using methods described below in connection with FIG. 6.

In some embodiments, the devices initially in the first group of devices may become second group devices and the devices initially in the second group of devices may become first group devices. This is especially suitable if the buffering issues were caused by the server being overloaded with requests for the media asset, i.e., the initial second group devices were not at fault for the buffering issues. In this situation, some second group devices may reestablish connection with the server while some first group devices may lose connection with the server. The second group devices may then begin sharing buffered content with the first group devices. In this embodiment, groupings of devices within which to share and receive media content remain the same, but the direction of content sharing traffic is reversed. Additionally, second group devices may be instructed to maintain portions of media asset 102 in a buffer as well, in order to facilitate this type of bidirectional sharing.

In some embodiments, server 100 stores a record detailing which portions of media asset 102 each device of the first group of devices 106 is maintaining in its respective buffer for sharing. Server 100 may update the record as portions of media asset 102 are stored or pushed out of the buffer of each device of the first group of devices 106. Server 100 may update this information using methods described below in connection with FIG. 10.

The improvement aspects outlined in FIG. 1 may be used with any other embodiment of this disclosure, and may be combined in any suitable combination, taken in part, or as a whole. In addition, the actions and descriptions described in relation to FIG. 1 may be done in any suitable alternative orders or in parallel to further the purposes of this disclosure. For example, groupings of devices may be determined prior to determining the first group of devices and second group of devices. In another example, groupings of devices may be determined without determining clusters of devices. In another example, clusters of devices may be the groupings of devices, without further load balancing algorithms applied to determine groupings within each cluster.

Figure 2:
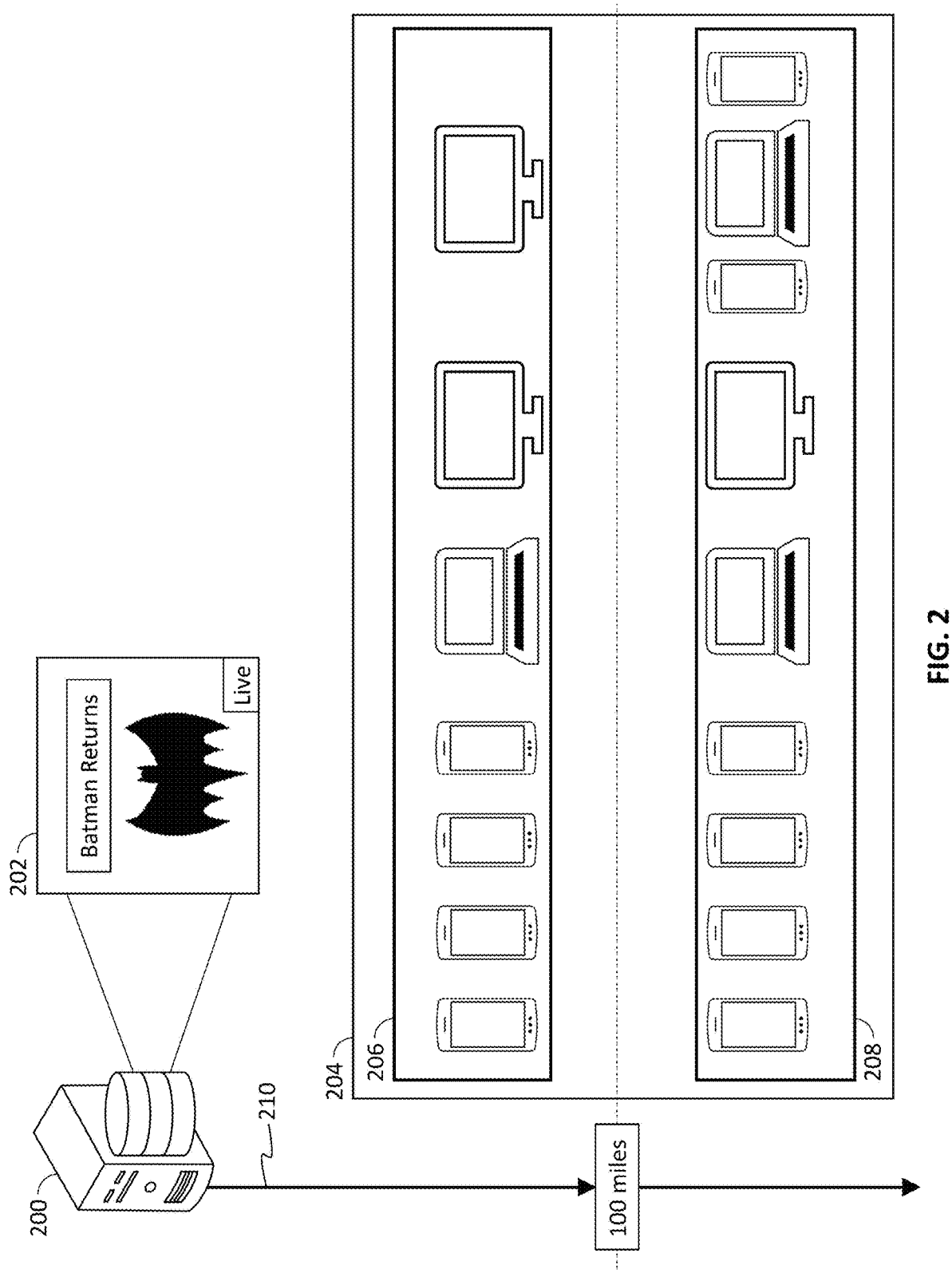
FIG. 2 is an illustrative example of a system for determining a first and a second group of devices, in accordance with some embodiments of the present disclosure.

FIG. 2 shows an illustrative example of a system for determining a first and a second group of devices, in accordance with some embodiments of the present disclosure. In some embodiments, the system includes server 200, media asset 202, and an arbitrary number ("N") of user devices 204. The system may include additional servers, devices, and/or networks. For example, functionality of server 200 may be shared between several servers, providing a cloud computing solution (e.g., as described below, with reference to FIG. 7). Again, as with FIG. 1, a single server 200 is depicted for simplicity.

Server 200 identifies a first group of devices 206. Similar to FIG. 1, above, the first group of devices 206 may be a first subset of the N user devices 204 requesting media asset 202, suitable for both (a) receiving media asset 202 from server 200 and (b) sharing media asset 202 on a network. Server 200 may also identify a second group of devices 208, a second subset of the N user devices 204 requesting media asset 202, suitable for receiving media asset 202 on the network from a device of the first group of devices 206. In some embodiments, identifying the first group of devices 206 and the second group of devices 208 is based on content delivery type of media asset 202, and intrinsic metadata associated with each device out of the N user devices 204 requesting media asset 202. The content delivery type of media asset 202 may be live or video-on-demand (VOD). Intrinsic metadata may be device location, device power status, device type, CPU utilization, device playback performance metrics, bit rate, network, or mobility. In the example depicted in FIG. 2, media asset 202 is live content, the first group of devices 206 is chosen based on the distance 210 of the devices from server 200. For example, all first group devices 206 are located within 100 miles of server 200, and the second group of devices 208 is made up of the remaining devices not chosen to be in the first group of devices 208, as they are not within 100 miles of server 200. As distance from server 200 increases, transmissions from server 200 to a given device of user devices 204 may pass through increasing numbers of network nodes, switches, routers, and the like before reaching their destination devices. This can add latency to the connection between server 200 and the given user device, thereby causing buffering issues.

Figure 3:
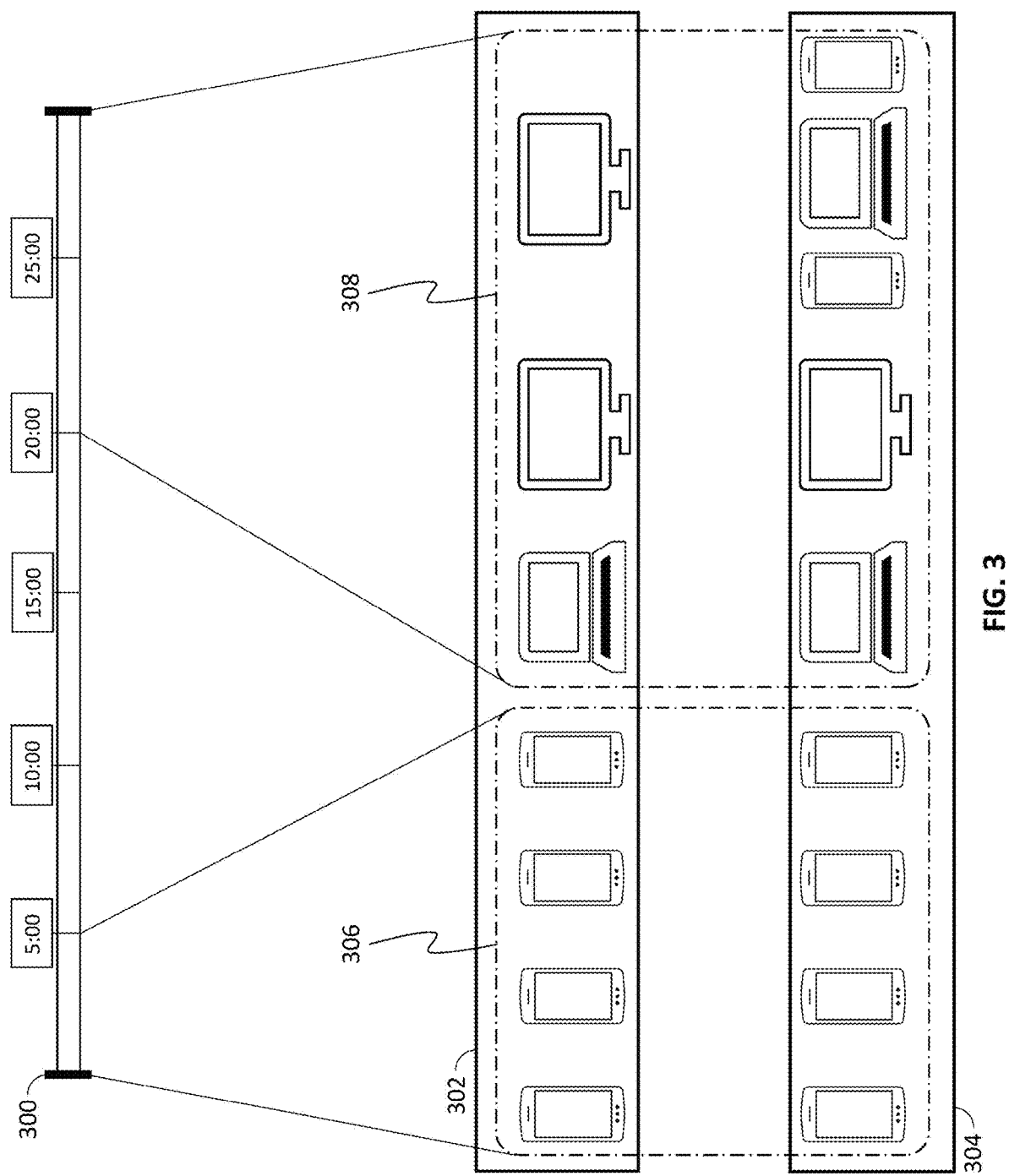
FIG. 3 is an illustrative example of a system for determining clusters of devices, in accordance with some embodiments of the present disclosure.

FIG. 3 shows an illustrative example of a system for determining clusters of devices, in accordance with some embodiments of the present disclosure. In some embodiments, determining clusters of devices is done by a server, e.g., server 100 from FIG. 1. Clusters of devices may be determined based on any one of or a combination of device progress within a media asset, device type, device location, and device ability to handle inbound and outbound traffic. In the example depicted in FIG. 3, clusters are determined based on device progress within a media asset. For a thirty-minute media asset, represented by timeline 300, a first group of devices 302 may be consuming a first portion of the media asset while a second group of devices 304 is consuming a second portion of the media asset. In this example, the server determines a first cluster of devices 306 whose current playback positions are between the beginning and minute 5:00 of the media asset and a second cluster of devices 308 whose current playback positions are within minute 20:00 and the end of the media asset. Each cluster contains devices from both the first group of devices 302 and the second group of devices 304. As each user device progresses through the media asset, the server may dynamically reassign devices from one cluster to another or may generate additional clusters as needed. For example, some user devices in the first cluster may pause playback of the media asset while others continue. This will cause the paused user devices to fall behind those user devices that continued playback uninterrupted. If the period of time for which the devices are paused is too long, the paused devices and uninterrupted devices will no longer be consuming similar portions of the media asset and will therefore not belong in the same cluster.

By clustering user devices together, the server separates the entire plurality of devices requesting the media asset into clusters of devices that are best suited to share and receive media content from each other, because clusters are determined based on one or a combination of device progress within a media asset, device type, device location, and device ability to handle inbound and outbound traffic. The server now has multiple clusters of devices to treat independently from each other when deciding load distribution instead of having to consider the entire plurality of devices requesting the media asset. This reduces time and resource load on the server and allows groupings to be determined more quickly and efficiently, as the server is considering fewer devices at a time when distributing media asset load between devices.

Figure 4:
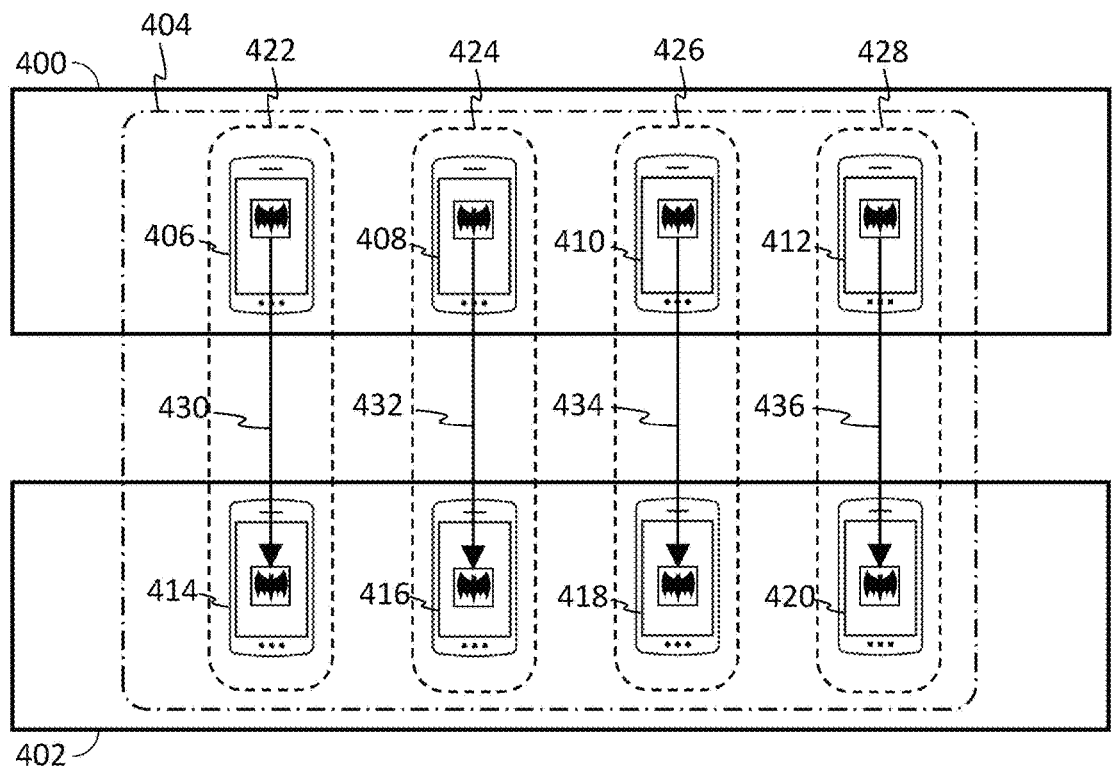
FIG. 4 is an illustrative example of a system for applying a round robin algorithm to determine groupings of devices within which to share and receive media content, in accordance with some embodiments of the present disclosure.

FIG. 4 shows an illustrative example of a system for applying a round robin algorithm to determine groupings of devices within which to share and receive media content, in accordance with some embodiments of the present disclosure. Devices in a first group of devices 400 and a second group of devices 402 are included in a cluster 404. The first group of devices 400 contains smartphones 406, 408, 410, and 412, and the second group of devices 402 contains smartphones 414, 416, 418, and 420. In some embodiments, determining groupings of devices is done by a server, e.g., server 100 from FIG. 1. The server may first determine a load balancing algorithm to apply to the cluster of devices 404 to determine groupings of devices 422, 424, 426, and 428. The server may determine which load balancing algorithm to apply based on any one or a combination of device type, current device playback performance metrics, quality of stream the device can serve, or number of requests the device can serve. The processing capabilities of the devices can be retrieved from a look-up table that gives devices a similarity score, and such table is regularly updated to account for new devices that are available on the market to consumers.

In one embodiment, the similarity score is temporarily modified based on the device's reported playback performance. For example, a device in the pool might have the same processing power and computing capabilities as the other devices, but its capacity for handling traffic or requests has been diminished due to factors such as spotty network connection, mobility, etc. In such scenario, the device can be moved to a different pool, such as a pool that receives requests under the weighted round robin algorithm.

In the example depicted within FIG. 4, the server determines that a round robin algorithm is the appropriate algorithm, since the smartphones of the first group of devices 400 and the second group 410 all are the same device type. In some embodiments, the application of a round robin algorithm results in the server evenly distributing upload traffic from first group devices 400 to second group devices 402 within the cluster of devices 404. In the example depicted in FIG. 4, the application of a round robin algorithm results in a first grouping 422, containing smartphone 406 and smartphone 414, second grouping 424, containing smartphone 408 and smartphone 416, third grouping 426, containing smartphone 410 and smartphone 418, and fourth grouping 428, containing smartphone 412 and smartphone 420. In this example, the first group devices 400 share certain media asset portions with second group devices 402 within their respective groupings. Thus, within grouping 422, smartphone 406 shares a media asset portion 430 with smartphone 414; within grouping 424, smartphone 408 shares a media asset portion 432 with smartphone 416; within grouping 426, smartphone 410 shares a media asset portion 434 with smartphone 418; and within grouping 428, smartphone 412 shares a media asset portion 436 with smartphone 420.

Figure 5:
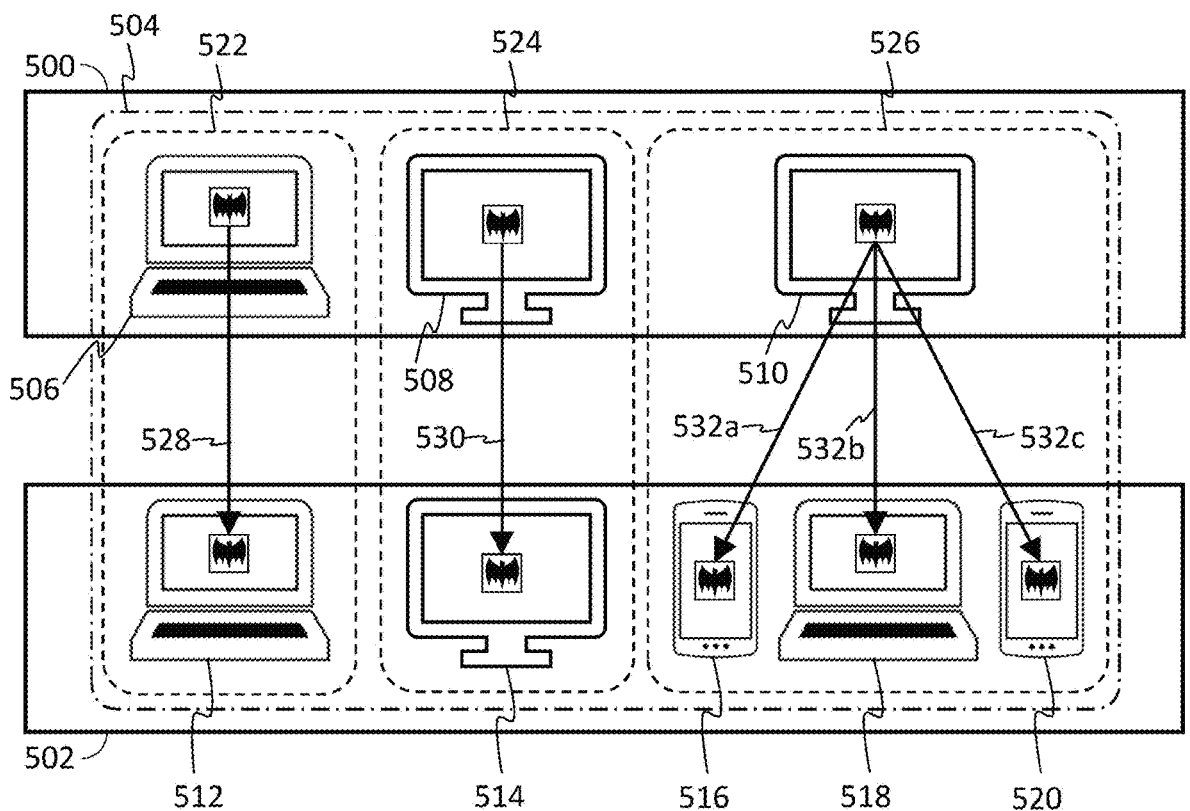
FIG. 5 is an illustrative example of a system for applying a weighted round robin algorithm to determine groupings of devices within which to share and receive media content, in accordance with some embodiments of the present disclosure.

FIG. 5 shows an illustrative example of a system for applying a weighted round robin algorithm to determine groupings of devices within which to share and receive media content, in accordance with some embodiments of the present disclosure. Devices of a first group of devices 500 and a second group of devices 502 are included in a cluster 504. The first group of devices 500 contains computer 506, television 508, and computer 510, and the second group of devices 502 contains computer 512, television 514, smartphone 516, computer 518, and smartphone 520. In some embodiments, determining groupings of devices is done by a server, e.g., server 100 from FIG. 1. The server may first determine a load balancing algorithm to apply to the cluster of devices 504 to determine groupings of devices 522, 524, and 526. The server may determine which load balancing algorithm to apply based on any one or a combination of device type, current device playback performance metrics, quality of stream the device can serve, or number of requests the device can serve.

In the example depicted within FIG. 5, the server determines that a weighted round robin algorithm is the appropriate algorithm, since there is a mixture of device types within cluster 504, including smartphones, computers, and televisions. After determining that a weighted round robin algorithm is appropriate, the server may assign weights to first group devices 500 and second group devices 502 based on one or a combination of device type, current device playback performance metrics, quality of stream the device can serve, or number of requests each first group device can serve. In the example depicted in FIG. 5, weights are assigned based on device type, e.g., each computer has a weight of two, each television has a weight of four, and each smartphone has a weight of one. In this example, because of the assigned weights, application of the weighted round robin algorithm results in a first grouping 522, containing computer 506 (having a weight of two) and computer 512 (having a weight of two); a second grouping 524, containing television 508 (having a weight of four) and television 514 (having a weight of four); and a third grouping 526, containing television 510 (having a weight of four), smartphone 516 (having a weight of one), computer 518 (having a weight of two), and smartphone 520 (having a weight of one). In each grouping, the sum of the weights of devices in the first group 500 is equal to the sum of the weights of the devices in the second group 502. In this example, the first group devices 500 share certain media asset portions with second group devices 502 within their respective groupings. Thus, within grouping 522, computer 506 shares a media asset portion 528 with computer 512; within grouping 524, television 508 shares a media asset portion 530 with television 514; and within grouping 526, television 510 shares a media asset portion 532a with smartphone 516, a media asset portion 532b with computer 518, and a media asset portion 516c with smartphone 520.

In some embodiments, application of the weighted round robin algorithm also determines how the media asset is shared from the first group devices. For example, the weights assigned by the server may dictate what quality of streams each device can serve, as well as how many requests it can serve. For example, one device might serve two consecutive segments every second, while another may only serve one segment every second. Such clients maintain different cache sizes since they are handling different number of requests.

Figure 6:
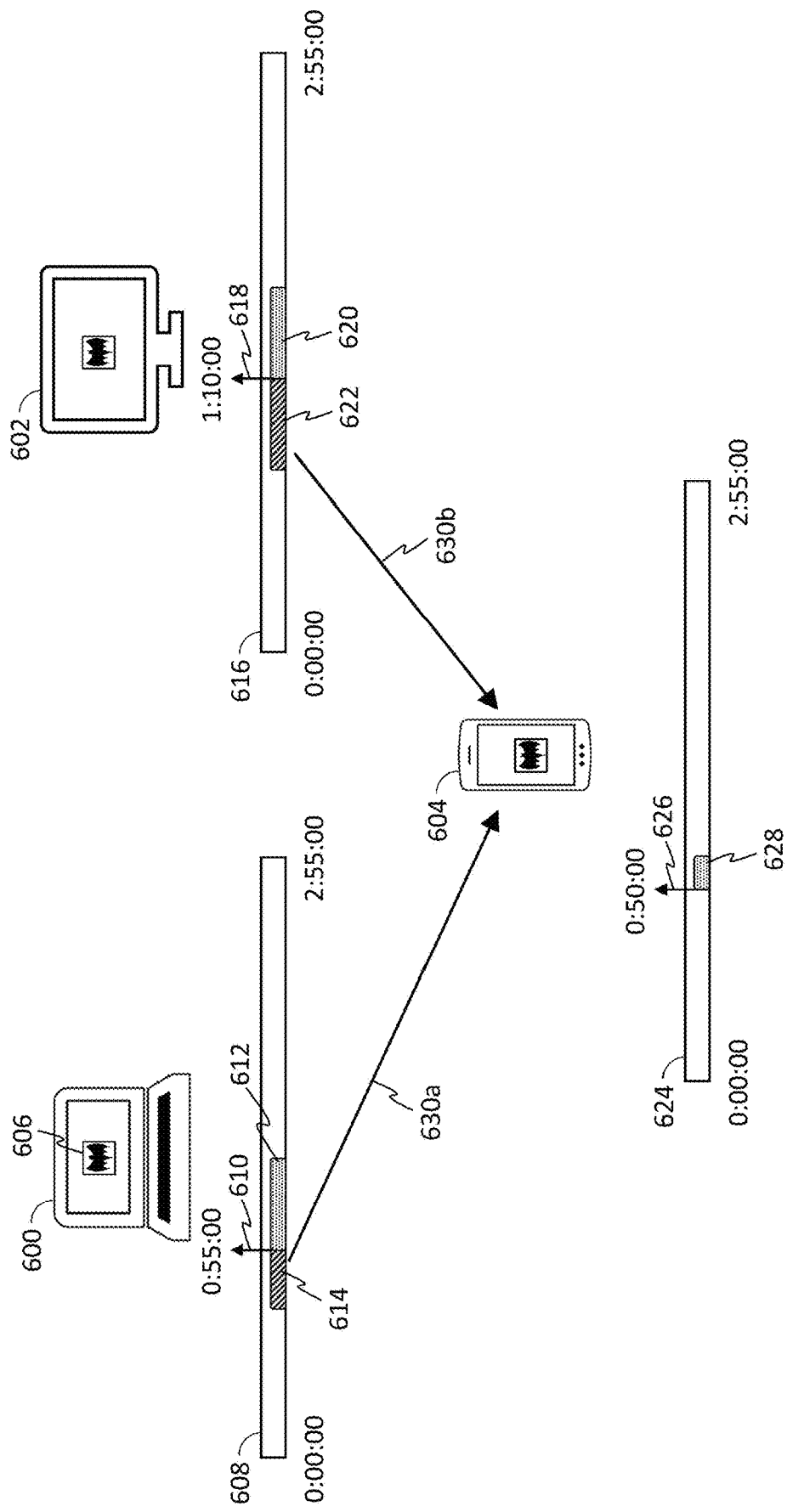
FIG. 6 is an illustrative example of a system for maintaining in buffer certain media asset portions within one or more first group devices, and sharing those portions with a second group device, in accordance with some embodiments of the present disclosure.

FIG. 6 shows an illustrative example of a system for maintaining in buffer certain media asset portions within one or more first group devices, and sharing those portions with a second group device, in accordance with some embodiments of the present disclosure. Computer 600 and television 602 may both be first group devices that are in the same grouping as smartphone 604, a second group device. The computer 600 is playing media asset 606. Progress bar 608 represents the viewing progress through media asset 606 on the computer 600. Playback position indicator 610 represents the current playback position for the computer 600, such as 0:55:00, or fifty-five minutes after the start of media asset 606. As part of its normal operations when receiving streaming media content, computer 600 may maintain a forward buffer containing an amount of media data ahead of the current playback position, represented by shaded bar 612. Computer 600 is also instructed e.g., by server 100 of FIG. 1, to maintain media data prior to the current playback position in a sharing buffer, represented by shaded bar 614. In some implementations, progress bar 608 is displayed as an overlay over playback of the media asset 606 on computer 600. The overlay may be displayed in response to a user input or may always be displayed.

Television 602 is also playing media asset 606. Progress bar 616 represents the viewing progress through media asset 606 on the television 602. Playback position indicator 618 represents the current playback position for television 602, such as 1:10:00, or one hour and ten minutes after the start of media asset 606. Television 602, like computer 600, may normally maintain a forward buffer, represented by shaded bar 620, and be instructed to maintain media data prior to the current playback position in a sharing buffer, represented by shaded bar 622. In some implementations, progress bar 616 is displayed as an overlay over playback of the media asset 606 on television 602. The overlay may be displayed in response to a user input or may always be displayed. Smartphone 604 is also playing media asset 606. Progress bar 624 represents the viewing progress through media asset 606 on the smartphone 604. Current playback position indicator 626 represents the current playback position for smartphone 604, such as 0:50:00, or fifty minutes after the start of media asset 606, and a forward buffer 628. In some implementations, progress bar 624 is displayed as an overlay over playback of the media asset 606 on smartphone 604. The overlay may be displayed in response to a user input or may always be displayed.

In some embodiments, a forward buffer is the portion of a media asset a device is maintaining in a buffer and storing for the purpose of the device itself being able to continue streaming the media asset. In some embodiments, a sharing buffer is a portion of a media asset that a device is maintaining in a buffer and storing for the purpose of sharing the portion with another device for the other device to view.

In some embodiments, the size and contents of the sharing buffer are determined for each first group device through application of a dynamic cache size algorithm. The dynamic cache size algorithm may be based on one or a combination of device progress within the media asset, content delivery type, and any kind of intrinsic metadata associated with the device, including device location, device power status, device type, CPU utilization, device playback performance metrics, bit rate, network, or mobility. In the example depicted in FIG. 6, the cache size of sharing buffer 614 is smaller than cache size of sharing buffer 622. This may be because computer 600 has less storage capability than television 602, or because television 602 has progressed further within media asset 606 than computer 600, or any one or a combination of the reasons listed above.

In some embodiments, once the cache size of a sharing buffer is determined, an ending point for the sharing buffer may be determined next. The ending point for the sharing buffer may be anywhere within a media asset before the end of the forward buffer for a media asset. The ending point for the sharing buffer may be determined based on first group device's progress within the media asset, as well as the progress within the media asset of the one or more second group devices the first group device will be sharing media asset portions with.

In the example depicted in FIG. 6, the ending point of the sharing buffer 614 for device 600 is determined to be at the current playback position indicator 610, and the ending point of the sharing buffer 622 for device 602 is determined to be at the current playback position indicator 618. In some embodiments, once the ending point of a sharing buffer is determined, a starting point for the sharing buffer may be determined next, based on the cache size of the sharing buffer. In this example, the locations of the starting point of the sharing buffer and the ending point of the sharing buffer determine the certain portions of the media asset to maintain in buffer and share, as all of the portions within the sharing buffer may be maintained in buffer and shared.

Once the starting point and ending point of the sharing buffer are determined, the portions within the sharing buffer may be maintained in buffer and shared. In the example depicted within FIG. 6, computer 600 maintains sharing buffer 614 in a buffer and shares the certain media asset portions 630a that are within sharing buffer 614 with smartphone 604. Also in the example depicted within FIG. 6, television 602 maintains sharing buffer 622 in a buffer and shares the certain media asset portions 630b that are within sharing buffer 622 with smartphone 604. Smartphone 604 stores the received media asset portions 630a and 630b in its own forward buffer 628.

Figure 7:
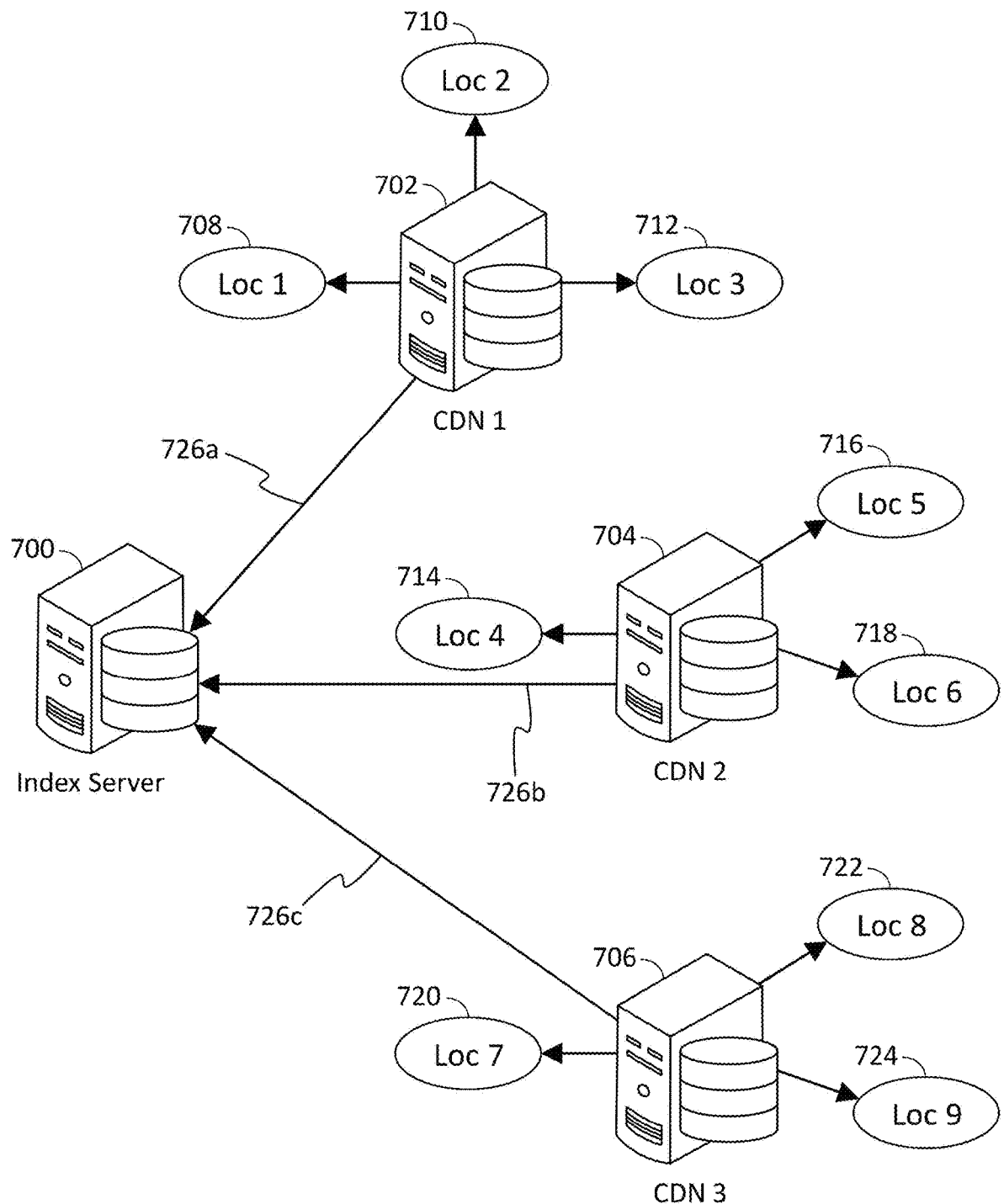
FIG. 7 is an illustrative example of a system for storing media content at an index server and a plurality of content delivery network servers, in accordance with some embodiments of the present disclosure.

FIG. 7 shows an illustrative example of a system for storing media content at an index server and a plurality of content delivery network servers, in accordance with some embodiments of the present disclosure. In some embodiments, the system includes index server 700, first content delivery network server (CDN 1) 702, second content delivery network server (CDN 2) 704, and third content delivery network server (CDN 3) 706. In some embodiments, each CDN server is at a different geographic location and is meant to serve user devices in its respective geographic location. For example, CDN 1 702 may be located in Montgomery, Alabama and is meant to deliver streaming content to user devices near that location, such as first location 708, second location 710, and third location 712. If CDN 1 702 is located in Montgomery, Alabama, first location 708 may be the entire state of Alabama, second location 710 may be the entire state of Mississippi, and third location 712 may be the entire state of Georgia. CDN 2 704 may be located in Pierre, South Dakota and is meant to deliver streaming content to user devices near that location, such as fourth location 714, fifth location 716, and sixth location 718. If CDN 2 704 is located in Pierre, South Dakota, fourth location 714 may be the entire state of South Dakota, fifth location 716 may be the entire state of North Dakota, and sixth location 718 may be the entire state of Nebraska. CDN 3 706 may be located in New York, New York, and is meant to deliver streaming content to user devices near that location, such as a seventh location 720, an eighth location 722, and a ninth location 724. If CDN 3 706 is located in New York, New York, then seventh location 720 may be the entire state of New York, eight location 722 may be the entire state of New Jersey, and ninth location 724 may be the entire state of Pennsylvania.

In some embodiments, functionality of server 100 of FIG. 1 may be shared between several servers. Differently located user devices may be using different content delivery network servers (CDNs) for streaming content based on their geographical locations. FIG. 7 depicts an example of a topology in which there are three different CDNs catering to different locations, as well as an independent index server, which stores the details of which media asset portions devices are maintaining in buffer and sharing. In some embodiments, more than one index server may also be provided, each index server serving a different geographic area that covers several locations served by different CDNs. In some embodiments, CDNs 704, 706, and 708 are edge servers which each receive media assets from a central storage server for streaming to client devices located near each respective CDN.

As each CDN server shares portions of media assets with user devices, and they each transmit (726*a*, 726*b*, 726*c*) updates to index server 700 which stores details of which user devices have received which portions of media assets. The CDN servers may also track which user devices are sharing portions of media assets with other user devices. When media asset portions are shared from user devices instead of CDN servers, the CDN servers may also transmit this information to index server 700, which stores the details of which media asset portions each user device is maintaining in its respective buffer and sharing with other user devices.

In one embodiment, the number of second group devices, i.e., devices to be disconnected from streaming directly from the edge servers of CDNs, is equivalent to the delta (number of devices) at which an edge server started experiencing an overload. For example, a typical edge server might be able to support several streaming sessions simultaneously, e.g., 5000 streaming sessions. However, the edge server might get overloaded when a substantial number of additional devices connect to it if it does not have enough computing power to support additional sessions. To manage this, the index server may rank the edge servers in order to determine from which edge server (e.g., CDN 1 702, CDN 2 704, or CDN 3 706) to disconnect clients. Such ranking may be based on one or a combination of the number of streaming sessions being supported and the content being served.

In some embodiments, the one or more index servers constantly poll the CDNs in their geographic area to check their health and determine whether they are overloaded. The index server is aware of each CDN's hardware specifications, e.g., CPU and memory. In one embodiment, the index server estimates the number of connections that the server can support based on the server's hardware specifications. In some embodiments, the index server is aware of which devices are connected to which edge servers of which CDNs. The index server, via the user agent header, may also be aware of the types of the devices streaming the media asset, e.g., smartphones, televisions, or computers. The index server may also be aware of the type of content being streamed, e.g., VOD movies or live sports broadcasts, as well as the portions of the content being streamed, e.g., the index server may be aware that a plurality of the client devices are fifteen minutes into a media asset, while others are thirty minutes from the end of a media asset.

Figure 8:
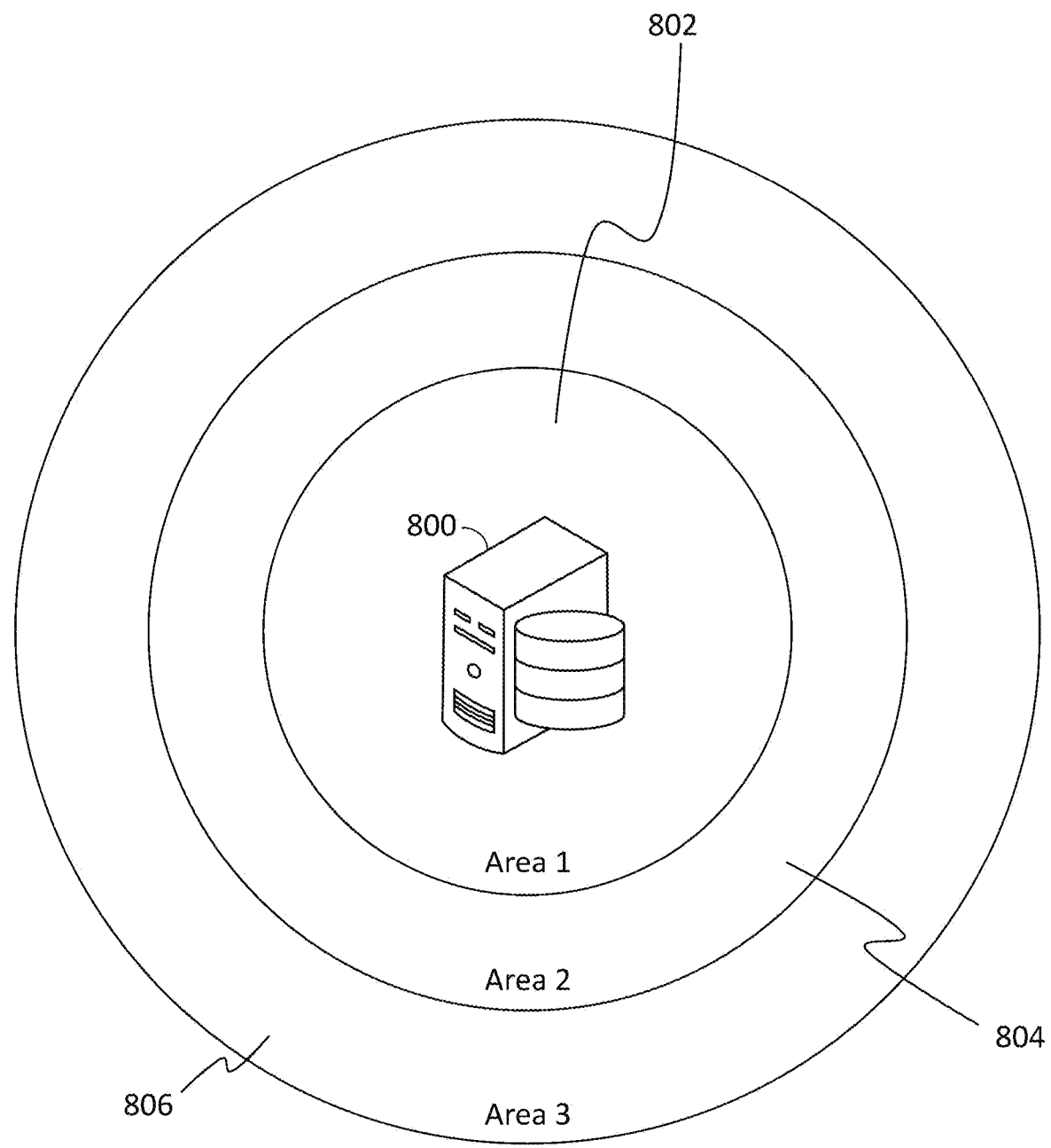
FIG. 8 shows a diagram of concentric circles based on network topology to signify topological or network hop wise distance between a server and a plurality of devices, in accordance with some embodiments of the present disclosure.

FIG. 8 shows a diagram of concentric circles based on network topology to signify topological or network hop wise distance between a server and a plurality of devices, in accordance with some embodiments of the present disclosure. In some embodiments, the system includes server 800, which may be similar to server 100 of FIG. 1 or any one of CDN 1 702, CDN 2 704, or CDN 3 706 of FIG. 7. Server 800 is located in a first area 802. User devices may be located in first area 802, farther away from server in 800 in a second area 804, or even farther away from server 800 in a third area 806. In the case that server 800 is similar to a CDN server, an index server, similar to index server 700 of FIG. 7, is also present and may be carrying out some or all of the processes described below. The index server may not be collocated with server 800 and may be located in any of areas 802, 804, and 806 or any other suitable location. As distance from server 800 increases, the number of network hops required for a transmission from server 800 to a user device increases. The resulting increase in latency is a condition indicating buffering issues for user devices within third area 806 that are requesting a media asset for viewing from server 800. In this example, user devices within third area 806 are the farthest from server 800, either topologically or network hop wise, user devices within second area 804 are closer to server 800, and user devices within first area 802 are the closest to server 800, as they are essentially collocated with server 800.

In some embodiments, when server 800 determines that there are conditions indicating buffering issues for user devices within third area 806, server 800 determines that user devices within second area 804 are topologically or network hop wise close to user devices in third area 806, and server 800 instructs the user devices within second area 804 to begin the process of maintaining a sharing buffer of media asset portions to share with user devices within third area 806 (e.g., as described above with reference to FIG. 6). In some embodiments, server 800 may then determine that user devices within first area 802 are topologically or network hop wise next closest to user devices in third area 806, and server 800 instructs the user devices within first area 802 to begin the process of maintaining a sharing buffer, smaller than that instructed to user devices in second area 804, of media asset portions to share with user devices within third area 806 (e.g., as described above with reference to FIG. 6).

In some embodiments, conditions indicating buffering issues may occur for user devices in different geographic locations. The network topology depicted in FIG. 8 may be plotted based on concentric circles centered on any of those geographic locations and trigger a similar series of load distribution operations among devices within different areas relative to those geographic locations.

Figure 9:
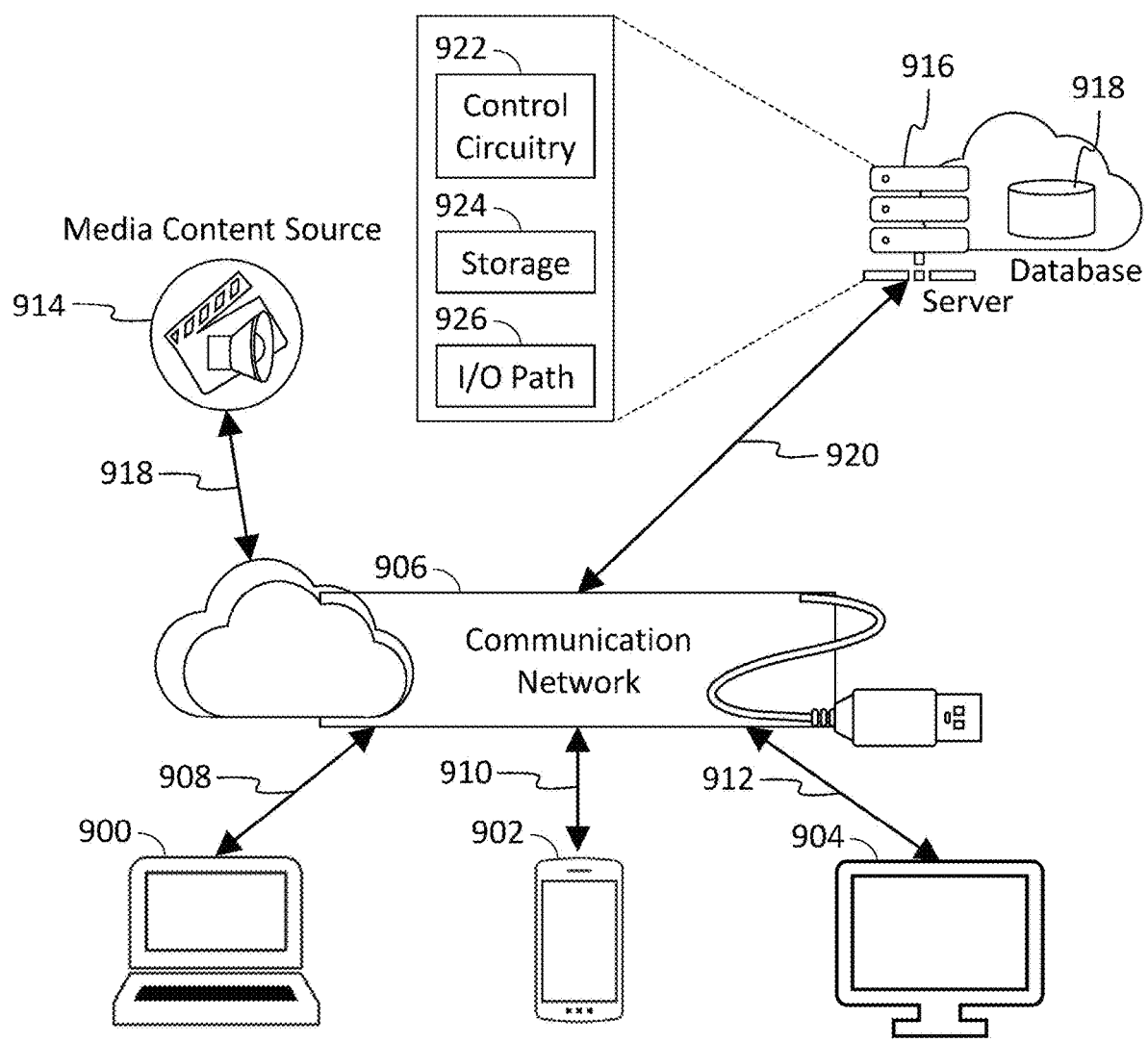
FIG. 9 shows a block diagram of an illustrative media system, in accordance with some embodiments of this disclosure.

FIG. 9 is a diagram of an illustrative streaming system, in accordance with some embodiments of the disclosure. User devices 900, 902, 904 (e.g., any one of N user devices 104 of FIG. 1) may be coupled to communication network 906. Communication network 906 may be one or more networks including the internet, a mobile phone network, mobile voice or data network (e.g., a 4G or LTE network), cable network, public switched telephone network, or other types of communication network or combinations of communication networks. In some embodiments, communication network 906 is the network of FIG. 1 over which OTT video delivery service server 100 receives requests. Communication paths 908, 910, and 912 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communication paths 908, 910, and 912 may be bidirectional. Communications with the client devices may be provided by one or more of these communications paths but are shown as a single path in FIG. 9 to avoid overcomplicating the drawing.

Although communications paths are not drawn between devices, these devices may communicate directly with each other via communications paths as well as other short-range, point-to-point communications paths, such as USB cables, IEEE 1394 cables, wireless paths including Bluetooth, infrared, IEEE 802.11x (Wi-Fi), etc., or other short-range communication via wired or wireless paths. The devices may also communicate with each other directly through an indirect path via communication network 906.

A media content source 914 is coupled to communication network 906. Media content source 914 may be a CDN server such as those described above in connection with FIG. 7. A server 916 is also coupled to communications network 906 and may comprise or be associated with database 918. Communications with media content source 914 may be exchanged over one or more unidirectional or bidirectional communication paths 918 and communications with server 916 may similarly be exchanged over one or more unidirectional or bidirectional communications paths 920 (both shown as single paths to avoid overcomplicating the drawing). In addition, there may be more than one of each of media content source 914 and server 916, but only one of each is shown in FIG. 9 to avoid overcomplicating the drawing. If desired, media content source 914 and server 916 may be integrated as one source device.

In some examples, the processes outlined above are performed by server 100 of FIG. 1. In some embodiments, server 916 may include control circuitry 922 and a storage 924 (e.g., RAM, ROM, hard disk drive, removable storage media, solid-state drive, etc.). In some embodiments, storage 924 may store instructions that, when executed by control circuitry 922, may cause execution of the processes outlined above.

Server 916 may also include an input/output path 926. I/O path 926 may provide device information, or other data, over a local area network (LAN) or wide area network (WAN), and/or other content and data to the control circuitry 922, and storage 924. The control circuitry 922 may be used to send and receive commands, requests, and other suitable data using I/O path 926, which may comprise I/O circuitry. I/O path 926 may connect control circuitry 922 to one or more communications paths.

Control circuitry 922 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 922 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 922 executes instructions for an emulation system application stored in memory (e.g., the storage 924). Memory may be an electronic storage device provided as storage 924 that is part of control circuitry 922.

User devices (e.g., user devices 900, 902, and 904) may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as server 916), which may be located centrally or at distributed locations, that provide cloud-based services to various types of users and devices connected via a network such as the internet via communication network 906. In such embodiments, devices may operate in a peer-to-peer manner without communicating with a central server.

Figure 10:
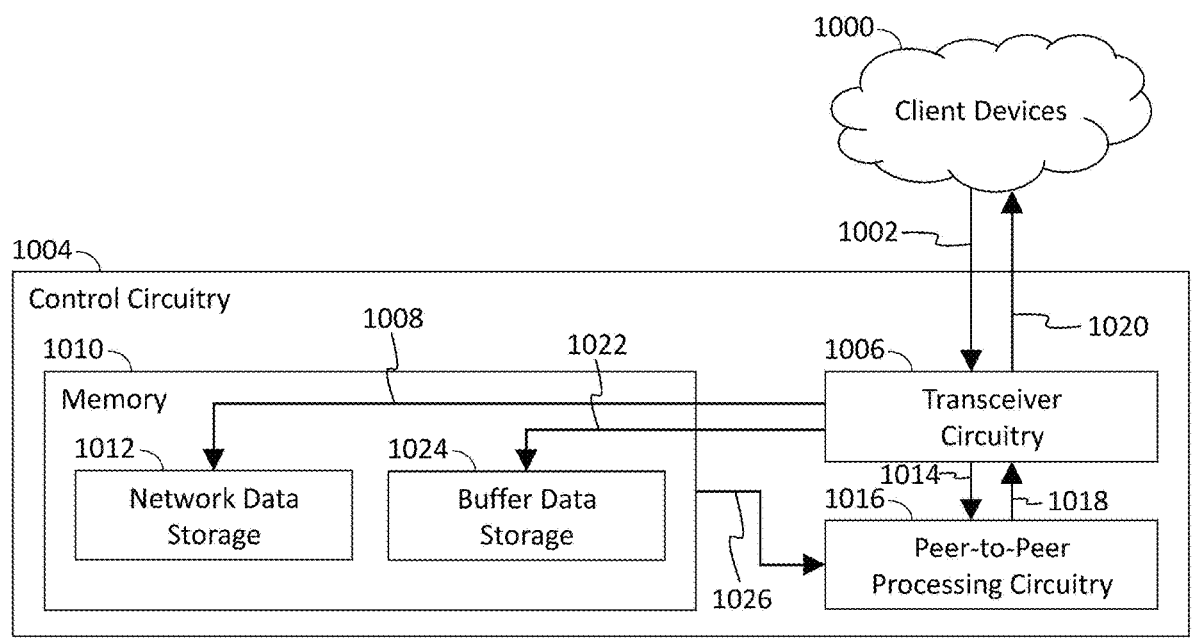
FIG. 10 is a block diagram showing components and data flow therebetween of an exemplary system for streaming a media asset to a plurality of devices requesting the media asset during unavailability of a content server, in accordance with some embodiments of the disclosure.

FIG. 10 is a block diagram showing components and data flow therebetween of an exemplary system for streaming a media asset to a plurality of devices requesting the media asset during unavailability of a content server, in accordance with some embodiments of the disclosure. Client devices 1000, which may be any devices capable of requesting media content (e.g., a smartphone, a smart TV, a tablet, or a computer), transmit 1002 requests for a media asset, information about conditions indicating buffering issues, network connectivity information, information about intrinsic device metadata, and information about the properties of the media asset being requested to control circuitry 1004. Control circuitry 1004 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, 10 for example, multiple of the same type of processing units (e.g., two Intel Core i7 processors) or multiple different processors (e.g., an Intel Core i5 processor and an Intel Core i7 processor).

Control circuitry 1004 receives the transmitted requests for the media asset, information about conditions indicating buffering issues, network connectivity information, information about intrinsic device metadata, and information about the properties of the media asset being requested using transceiver circuitry 1006. Transceiver circuitry 1006 comprises a network connection over which data can be transmitted to and received from remote devices, such as an ethernet connection, Wi-Fi connection, or connection employing any suitable networking protocol. Transceiver circuitry 1006 sends 1008 network connectivity information to memory 1010. Memory 1010 may be an electronic storage device (e.g., RAM, ROM, hard disk, removable disk, etc.) The network connectivity information is stored in a portion of memory 1010, network data storage 1012. Transceiver circuitry 1006 also sends 1014 requests for the media asset, information about conditions indicating buffering issues, network connectivity information, information about intrinsic device metadata, and information about the properties of the media asset being requested to peer-to-peer processing circuitry 1016.

Peer-to-peer processing circuitry 1016 determines whether there are conditions indicating buffering issues and for which devices there may be issues based on the information about conditions indicating buffering issues, and network connectivity information sent to control circuitry 1004. Based on which devices may be experiencing issues, as well as the requests for a media asset, information about intrinsic device metadata, and information about the properties of the media asset, peer-to-peer processing circuitry 1016 identifies a first group of devices suitable for receiving the media asset and sharing the media asset on a network, as well as a second group of devices suitable for receiving the media asset on a network from a device out of the first group. Peer-to-peer processing circuitry 1016 then determines groupings of devices from the first group and the second group, based on the requests for a media asset, information about intrinsic device metadata, and information about the properties of the media asset. In order to determine these groupings, peer-to-peer processing circuitry 1016 may first determine clusters of the devices requesting the media asset, then apply load balancing algorithms, such as a round robin or a weighted round robin algorithm, to the clusters.

Peer-to-peer processing circuitry 1016 then constructs instructions describing which devices are to maintain in a buffer which certain portions of the media asset for sharing with other devices on a network based on the determined groupings. Peer-to-peer processing circuitry 1016 transmits 1018 these instructions to transceiver circuitry 1006. Transceiver circuitry 1006 in turn transmits 1020 these instructions to client devices 1000. Transceiver circuitry 1006 also sends 1022 to memory 1010 information detailing which devices are maintaining certain portions of the media asset in a buffer for sharing with other devices on a network. This information is stored in a portion of memory 1010, buffer data storage 1024. As additional requests, network connectivity data, and buffer data are received from client devices 1000, memory 1010 sends 1026 to peer-to-peer processing circuitry 1016 information detailing network data and which devices are maintaining certain portions of the media asset in a buffer for sharing with other devices on a network. This information enables the peer-to-peer processing circuitry 1016 to construct further instructions of which devices are to maintain in a buffer certain portions of the media asset for sharing with other devices on a network.

In some embodiments, the device in which control circuitry 1004 resides is responsible not only for handling peer-to-peer processing and media sharing instructions, but also for storage of media assets to be streamed to user devices. In these embodiments, further portions of memory 1010 may be used for storage of media data representing one or more media assets.

In one embodiment, peer-to-peer processing circuitry 1016 transmits to client devices, through transceiver circuitry 1006, a universal manifest. The universal manifest instructs all first group devices in a cluster on which segments to cache in a buffer in anticipation that such segments will need to be served to client devices that are behind other client devices in streaming the media asset, e.g., one client device might be 30 seconds behind another client device in playback. Such determination may be made based on whether the device is part of a grouping that is being load-balanced based on a round robin or weighted round robin algorithm, as described above. In some embodiments, the universal manifest may instruct all devices in the cluster to cache certain portions of the media asset. The manifest also includes information on which segments have been cached by each device in the cluster and for how long. Therefore, the clients that are streaming directly from the server can rely on other clients (e.g., via peer-to-peer) that are caching content to retrieve segments when performing trick play functionality. In some embodiments, a dedicated trick play manifest may be generated based on the currently cached segments or segments to be cached based on a look-ahead algorithm that is being utilized by the device the control circuitry resides in. The content of such manifest can change during the streaming of a movie as different clients serve the segments they were required to serve and no longer need to cache it (based on Cache-Control HTTP header).

Figure 11:
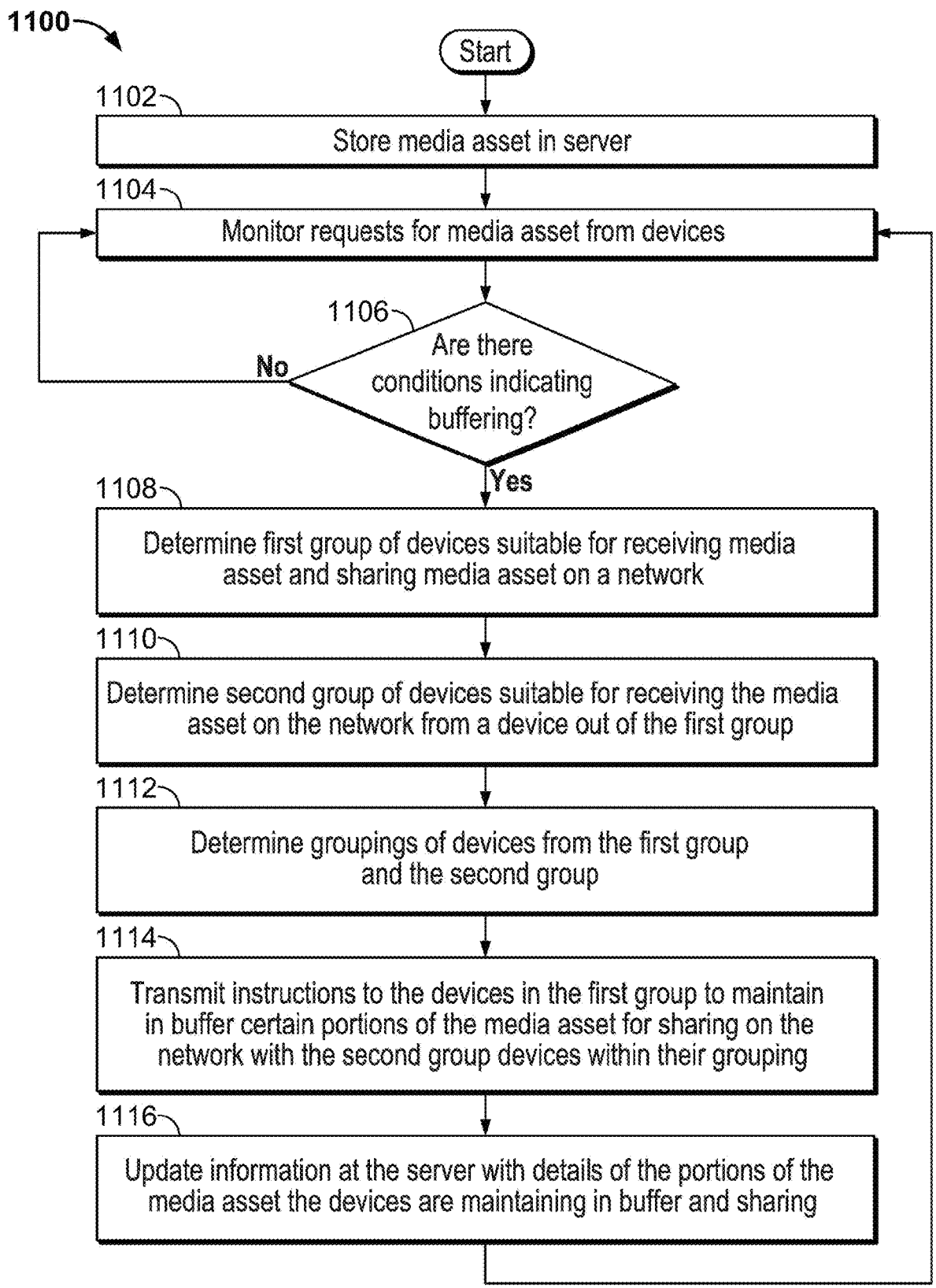
FIG. 11 shows a flowchart of an illustrative process for streaming a media asset to a plurality of devices requesting the media asset during unavailability of a content server, in accordance with some embodiments of the present disclosure.

FIG. 11 shows a flowchart of an illustrative process 1100 for streaming a media asset to a plurality of devices requesting the media asset during unavailability of a content server, in accordance of some embodiments of the present disclosure. Process 1100 may be implemented on control circuitry 1004. In addition, one or more actions of process 1100 may be incorporated into or combined with one or more actions of any other process or embodiment described herein.

At 1102, control circuitry 1004 stores a media asset (e.g., media asset 102 of FIG. 1) in a server (e.g., server 100 of FIG. 1) or in memory (e.g., memory 1010). The stored media asset may comprise a complete media file or may comprise a plurality of media segments. At 1104, control circuitry 1004 monitors requests for the media asset from user devices (e.g., N user devices 104 of FIG. 1). For example, control circuitry 1004 may monitor the frequency of requests from each user device. A decrease in frequency of requests received from a particular user device may indicate that there are bandwidth limitations and/or latency in the network connection of the particular user device. Control circuitry 1004 may also receive, as part of the requests or as separate transmissions, network connectivity data from each user device. Control circuitry 1004 monitors the network connectivity data to identify decreased performance for any user device. At 1106, control circuitry 1004 determines whether there are conditions indicating buffering issues. Methods for accomplishing this are described below in connection with FIG. 12. If there are not conditions indicating buffering issues ("No" at 1106), then processing returns to 1104, where control circuitry 1004 continues to monitor requests for the media asset.

If there are conditions indicating buffering issues ("Yes" at 1106), then, at 1108, the control circuitry identifies a first group of devices suitable for receiving the media asset and sharing the media asset on a network. For example, all devices within 100 miles of the server may be determined to be within the first group of devices. At 1110, the control circuitry identifies a second group of devices suitable for receiving the media asset on a network from a device out of the first group. At 1112, control circuitry 1004 determines groupings of devices from the first group and the second group. Methods for accomplishing this are described below in connection with FIG. 13. At 1114, control circuitry 1004 transmits instructions to the first group devices to maintain in a buffer certain portions of the media asset for sharing on a network with the second group devices within its grouping. For example, a first group device may receive the instruction to maintain a 100 megabit buffer starting at the beginning of the movie, and ending ten minutes into the movie. At 1116, control circuitry 1004 updates information at the server with details of the portions of the media asset the first group devices are maintaining in a buffer and sharing. For example, the server will receive and store updated information about a first group device that is maintaining a 100 megabit buffer starting at the beginning of the movie and ending ten minutes into the movie. Processing then returns to 1104 where control circuitry 1004 continues to monitor requests for the media asset from devices.

The actions or descriptions of FIG. 11 may be used with any other embodiment of this disclosure. In addition, the actions and descriptions described in related to FIG. 11 may be done in suitable alternative orders or in parallel to further the purposes of this disclosure.

Figure 12:
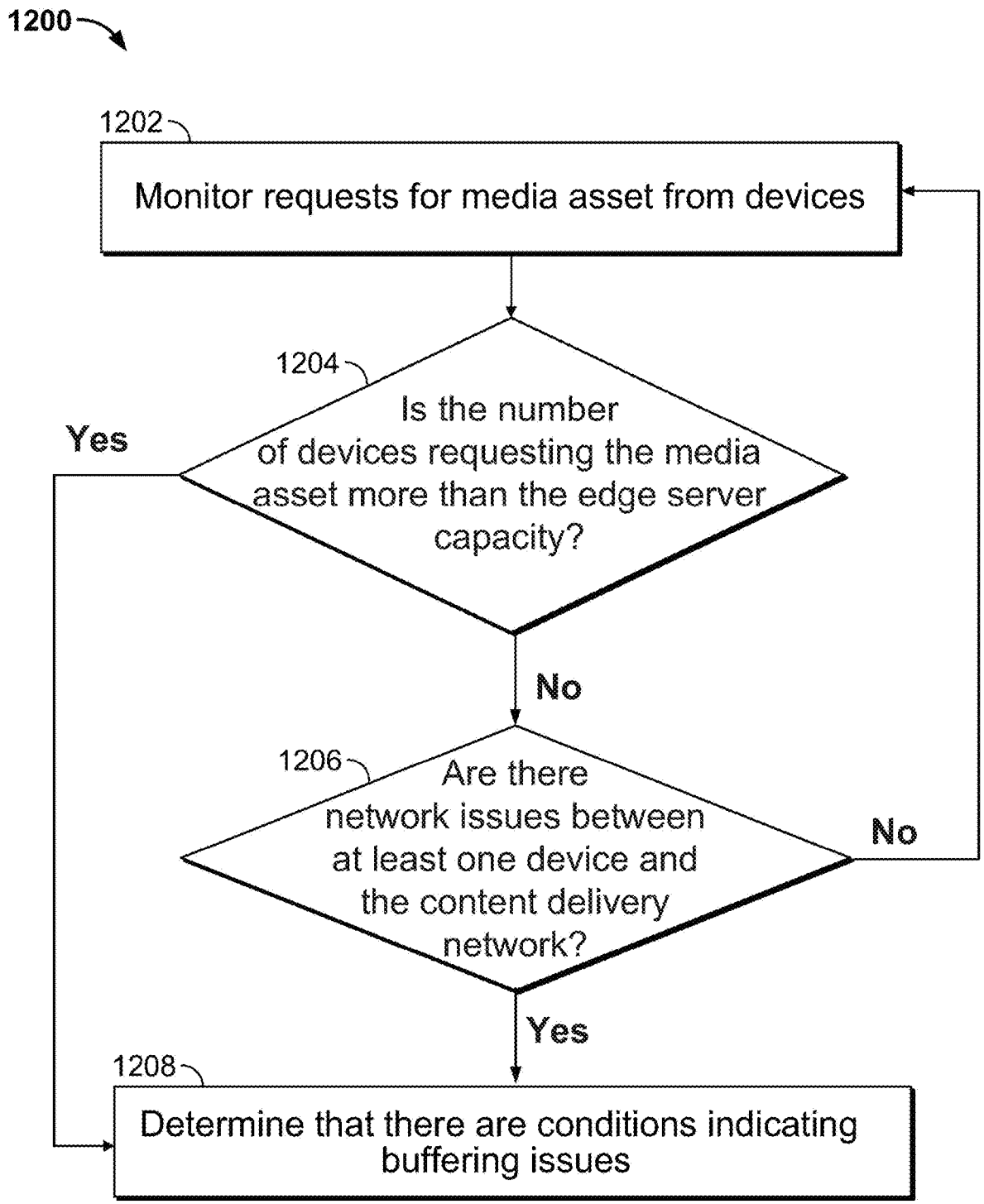
FIG. 12 shows a flowchart of an illustrative process for determining conditions indicating buffering issues, in accordance with some embodiments of the present disclosure.

FIG. 12 shows a flowchart of an illustrative process 1200 for determining conditions indicating buffering issues, in accordance with some embodiments of the present disclosure. Process 1200 may be implemented on control circuitry 1004. In addition, one or more actions of process 1200 may be incorporated into or combined with one or more actions of any other process or embodiment described herein.

At 1202, control circuitry 1004 monitors requests for a media asset from user devices (e.g., N user devices 104 of FIG. 1). Methods for accomplishing this are discussed above in connection with FIG. 11. At 1204, control circuitry 1004 determines if the number of devices requesting the media asset is more than the capacity of the edge server (e.g., server 100 of FIG. 1, or any one of CDN 1 702, CDN 2 704, or CDN 3 706 of FIG. 7). For example, an edge server may be able to open a certain number of simultaneous network connections at once. This limits the capacity of the edge server to simultaneously serving only the number of devices corresponding to the number of simultaneous network connections the edge server can open. If the number of devices requesting the media asset is not more than the capacity of the edge server ("No" at 1204), then, at 1206, control circuitry 1004 determines whether there are network issues between at least one device and the edge server. For example, slow internet performance may be detected at multiple devices of the devices requesting media content from the edge server. If there are no network issues between any of the devices and the server ("No" at 1206), then processing returns to 1202. If the number of devices requesting the media asset is more than the capacity of the edge server ("Yes" at 1204) or if there are network issues between at least one device and the server ("Yes" at 1206), then, at 1208, the control circuitry determines that there are conditions indicating buffering issues.

The actions or descriptions of FIG. 12 may be used with any other embodiment of this disclosure. In addition, the actions and descriptions described in related to FIG. 12 may be done in suitable alternative orders or in parallel to further the purposes of this disclosure.

Figure 13:
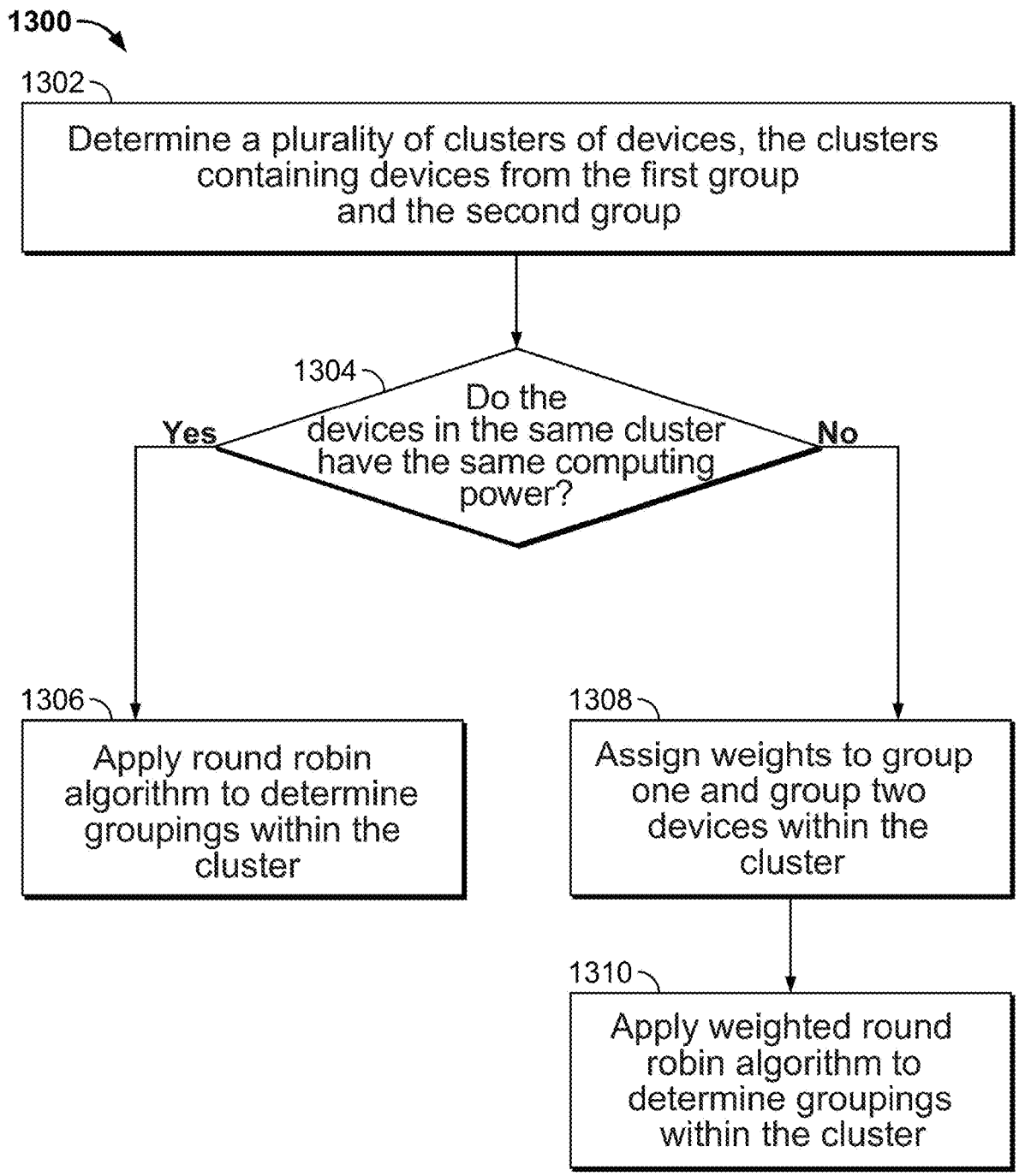
FIG. 13 shows a flowchart of an illustrative process for determining groupings of devices within which to share and receive media content, in accordance with some embodiments of the present disclosure.

FIG. 13 shows a flowchart of an illustrative process 1300 for determining groupings of devices within which to share and receive media content, in accordance with some embodiments of the present disclosure. Process 1300 may be implemented on control circuitry 1004. In addition, one or more actions of process 1300 may be incorporated into or combined with one or more actions of any other process or embodiment described herein.

At 1302, control circuitry 1004 determines a plurality of clusters of devices, the clusters containing devices from the first group of devices (e.g., the first group of devices 106 of FIG. 1) and the second group of devices (e.g., the second group of devices 108 of FIG. 1). For example, all devices with a current playback position within the first five minutes of a media asset are in one cluster, and all devices with a current playback position within the last ten minutes of the media asset are in another cluster. At 1304, control circuitry 1004 determines whether the devices in each cluster have the same computing power. For example, if all the devices in a cluster are the same type of device, e.g., smartphones, they may have the same computing power. If the devices within the cluster are a mix of types, e.g., laptops, smartphones, and televisions, they may not have the same computing power. If the devices in the cluster have the same computing power ("Yes" at 1304), then, at 1306, the control circuitry applies a round robin algorithm to determine groupings within the cluster. For example, the round robin algorithm may comprise evenly distributing upload traffic from first group devices to second group devices within each cluster. Each first group device may be tasked with sharing portions of the media asset with one second group device. If the devices in the cluster do not have the same computing power ("No" at 1304), then, at 1308, the control circuitry assigns weights to group one and group two devices within the cluster. For example, each device will receive a weight in accordance with its processing power, e.g., the smartphones will receive a weight of one, the computers will receive a weight of two, and the televisions will receive a weight of four. At 1310, the control circuitry applies a weighted round robin algorithm to determine groupings within the cluster. The weighted round robin algorithm may consist of distributing upload traffic from first group devices to second group devices within each cluster based on the weights. For example, a first group device with a weight of two will be placed in a grouping with one or more second group devices that have a sum total processing power of two, or a first group device with a weight of four will be placed in a grouping with one or more second group devices that have a sum total processing power of four.

The actions or descriptions of FIG. 13 may be used with any other embodiment of this disclosure. In addition, the actions and descriptions described in related to FIG. 13 may be done in suitable alternative orders or in parallel to further the purposes of this disclosure.

The foregoing is merely illustrative of the principles of this disclosure and its various embodiments. The processes described above are intended to be illustrative and not limiting. Various modifications may be made by those skilled in the art without departing from the scope of this disclosure, and those skilled in the art would appreciate that the steps of the processes discussed herein may be omitted, modified, combined, and/or rearranged, and any additional steps may be performed without departing from the scope of the disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations and modifications thereof, which are within the spirit of the following claims. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   determining that an edge server is overloaded;
   identifying a plurality of devices connected to the edge server;
   assigning one or more first devices of the plurality of devices to a device cluster, wherein the one or more first devices are capable of receiving a media asset from the edge server and distributing the media asset to at least one other device of the plurality of devices;
   assigning one or more second devices of the plurality of devices to the device cluster, wherein the one or more second devices are capable of receiving the media asset from the one or more first devices;

assigning weights to the one or more first devices and the one or more second devices based on at least one or more factors associated with the plurality of devices, and wherein the weights are used by one or more weighted load balancing algorithms, wherein the one or more factors associated with the plurality of devices comprises at least one of content delivery type for the media asset, device location, device power status, device type, processor utilization, device playback performance metrics, bit rate, network metadata, mobility metadata, device progress within the media asset, device capability to handle inbound and outbound traffic, stream quality, or request capacity;

transmitting one or more instructions configured to cause the one or more first devices to distribute the media asset to the one or more second devices in the device cluster; and distributing upload traffic from the one or more first devices to the one or more second devices based on the weights.

2. The method of claim 1, wherein the one or more first devices and the one or more second devices in the device cluster are interconnected via a peer-to-peer network.

3. The method of claim 1, wherein the transmitting one or more instructions configured to cause the one or more first devices to distribute the media asset to the one or more second devices in the device cluster comprises transmitting an instruction configured to cause the one or more first devices to maintain a portion of the media asset in a buffer for distributing the portion to the one or more second devices.

4. The method of claim 1, wherein the transmitting one or more instructions configured to cause the one or more first devices to distribute the media asset to the one or more second devices in the device cluster comprises reducing a network load of the edge server.

5. The method of claim 1, wherein the one or more weighted load balancing algorithms comprises a round robin algorithm configured to evenly distribute upload traffic from the one or more first devices to the one or more second devices in the device cluster.

6. The method of claim 5, wherein the one or more first devices has an equal number of devices as the one or more second devices in the device cluster.

7. The method of claim 1, wherein the one or more first devices has fewer devices than the one or more second devices in the device cluster.

8. The method of claim 1, wherein the determining that the edge server is overloaded comprises determining that one or more conditions at the edge server indicate buffering issues during delivery of the media asset to at least one device of the plurality of devices connected to the edge server.

9. A system comprising:
control circuitry configured to:
determine that an edge server is overloaded;
identify a plurality of devices connected to the edge server;
assign one or more first devices of the plurality of devices to a device cluster, wherein the one or more first devices are capable of receiving a media asset from the edge server and distributing the media asset to at least one other device of the plurality of devices;
assign one or more second devices of the plurality of devices to the device cluster, wherein the one or more second devices are capable of receiving the media asset from the one or more first devices;
assign weights to the one or more first devices and the one or more second devices based on at least one or more factors associated with the plurality of devices, and wherein the weights are used by one or more weighted load balancing algorithms, wherein the one or more factors associated with the plurality of devices comprises at least one of content delivery type for the media asset, device location, device power status, device type, processor utilization, device playback performance metrics, bit rate, network metadata, mobility metadata, device progress within the media asset, device capability to handle inbound and outbound traffic, stream quality, or request capacity; and one or more communication paths coupled to the control circuitry and configured to:
transmit one or more instructions configured to cause the one or more first devices to distribute the media asset to the one or more second devices in the device cluster; and
distribute upload traffic from the one or more first devices to the one or more second devices based on the weights.

10. The system of claim 9, wherein the one or more first devices and the one or more second devices in the device cluster are interconnected via a peer-to-peer network.

11. The system of claim 9, wherein the control circuitry is further configured to transmit an instruction configured to cause the one or more first devices to maintain a portion of the media asset in a buffer for distributing the portion to the one or more second devices.

12. The system of claim 9, wherein the control circuitry, when transmitting one or more instructions configured to cause the one or more first devices to distribute the media asset to the one or more second devices in the device cluster, is configured to reduce a network load of the edge server.

13. The system of claim 9, wherein the one or more weighted load balancing algorithms comprises a round robin algorithm configured to evenly distribute upload traffic from the one or more first devices to the one or more second devices in the device cluster.

14. The system of claim 13, wherein the one or more first devices has an equal number of devices as the one or more second devices in the device cluster.

15. The system of claim 9, wherein the one or more first devices has fewer devices than the one or more second devices in the device cluster.

16. The system of claim 9, wherein the control circuitry, when determining that the edge server is overloaded, is configured to determine that one or more conditions at the edge server indicate buffering issues during delivery of the media asset to at least one device of the plurality of devices connected to the edge server.

* * * * *